US008733588B2

(12) United States Patent

Ophardt et al.

(10) Patent No.: US 8,733,588 B2

(45) Date of Patent: May 27, 2014

(54) AIR ASSISTED SEVERANCE OF VISCOUS FLUID STREAM

(75) Inventors: Heiner Ophardt, Arisdorf (CH); Ali Mirbach, Issum (DE)

(73) Assignee: Gotohti.com Inc., Beamsville (CA)

( * ) Notice: Subject to any disclaimer, the term of this patent is extended or adjusted under 35 U.S.C. 154(b) by 34 days.

(21) Appl. No.: 13/291,262

(22) Filed: Nov. 8, 2011

(65) Prior Publication Data

US 2012/0132668 A1 May 31, 2012

(30) Foreign Application Priority Data

Nov. 26, 2010 (CA) ..................................... 2722646

(51) Int. Cl.
*G01F 11/00* (2006.01)

(52) U.S. Cl.
USPC ......... 222/1; 222/181.1; 222/181.3; 222/190; 222/209; 222/321.3; 222/321.8; 222/571

(58) Field of Classification Search
USPC ......... 222/1, 190, 181.1, 181.3, 321.1, 321.3, 222/321.8, 384, 401, 571, 209
See application file for complete search history.

(56) References Cited

U.S. PATENT DOCUMENTS 4,901,925 A * 2/1990 Blake, III ...................... 239/343
4,957,218 A * 9/1990 Ford, Jr. ............................ 222/1
5,207,352 A * 5/1993 Porter et al. ...................... 222/1
5,238,155 A * 8/1993 Blake, III ...................... 222/190
5,269,444 A * 12/1993 Wright .......................... 222/190
5,398,845 A * 3/1995 Meyer ............................... 222/1
5,439,140 A * 8/1995 Meyer ........................... 222/110
5,975,360 A 11/1999 Ophardt
6,460,739 B1 10/2002 Norris et al.
6,601,736 B2 8/2003 Ophardt et al.
7,267,251 B2 9/2007 Ophardt
7,621,465 B2 * 11/2009 Riney ............................ 239/298
7,823,751 B2 11/2010 Ophardt et al.
8,196,780 B2 6/2012 Ophardt et al.
8,272,539 B2 9/2012 Ophardt et al.
8,360,286 B2 1/2013 Shi et al.
8,365,965 B2 2/2013 Ophardt
8,474,664 B2 7/2013 Ophardt et al.
2007/0102539 A1 5/2007 Riney

FOREIGN PATENT DOCUMENTS

JP 3254851 11/1991

* cited by examiner

*Primary Examiner* — Frederick C Nicolas

(74) *Attorney, Agent, or Firm* — Thorpe North & Western LLP

(57) ABSTRACT

Methods and apparatus for dispensing flowable fluids, particularly those which are high viscosity by passing a stream of fluid through an elongate discharge passageway and injecting air into the fluid stream to initiate severing of the stream between an inner portion inward of the injected air and an outer portion outward of the injected air.

20 Claims, 32 Drawing Sheets

AIR ASSISTED SEVERANCE OF VISCOUS FLUID STREAM

SCOPE OF THE INVENTION

This invention relates generally to methods and pumps useful for dispensing pastes and high viscosity or viscoelastic flowable materials and, more preferably, to methods and pumps for assisted severance of a stream of flowable materials by the injection of air.

BACKGROUND OF THE INVENTION

Many pump assemblies are known for dispensing flowable materials, however, most pumps generally have the disadvantage that they have difficulty in dispensing high viscosity flowable creams and lotions such as toothpaste, viscous skin creams and hand cleaners whether or not they include particulate solid matter. Difficulty in dispensing is particularly acute where the fluids are viscoelastic. For example, in dispensing liquid honey, a difficulty arises that after dispensing, an elongate string of honey is formed which extends from a discharge outlet.

Some high viscosity flowable pastes include particulate solid matter. The particulate solid matter may include grit and pumice. Grit is granular material, preferably sharp and relatively fine-sized as being used as an abrasive. Pumice is a volcanic glass which is full of cavities and very lightweight and may be provided as different sized particles to be used as an abrasive and absorbent in cleaners.

SUMMARY OF THE INVENTION

To at least partially overcome these disadvantages of previously known devices the present invention provides methods and apparatus for dispensing flowable fluids, particularly those which are viscous or viscoelastic, by ejecting air into a stream of the fluid being dispensed to assist in severing the stream.

The present invention is particularly applicable to fluid dispensers in which fluid is to be dispensed out of an outlet with the outlet forming an open end of a tubular member. Preferably, the tubular member has its outlet opening downwardly and fluid stream which passes through the tubular member is drawn downwardly by gravity, however, this is not necessary.

The present invention provides a method of dispensing of fluid comprising passing fluid longitudinally outwardly and preferably downwardly through an elongate discharge passageway as a fluid stream to thereby dispense the stream at a preferably downwardly directed discharge outlet of the passageway preferably open to the atmosphere, and injecting an allotment of air into the passageway proximate the discharge outlet with the injected allotment of air having a volume sufficient to substantially sever an inner stream portion of the fluid stream inward of the injected allotment of air from an outer stream portion of the fluid stream outward of the injected allotment of air. Preferably, the step of injecting the allotment of air into the passageway includes displacing with the injected air the outer stream portion outwardly in the passageway relative the inner stream portion.

The method may be carried out in an apparatus which will discharge the fluid and will provide pressurized air at a suitable location in a stream of discharge fluid preferably within a discharge passageway within a stream of fluid being discharged is constrained. Almost any manner of pump may be used to discharge the fluid and the pressurized air may come from various sources such as pumps and reservoirs of pressurized air.

The method is particularly advantageous for use with fluids having a sufficiently high viscosity to assist in resisting flow of air upwardly within the fluid in the discharge passageway through the inner stream portion. The passageway preferably has a cross-sectional area selected having regard to the viscosity of the fluid so as to assist in resisting flow of air upwardly within the fluid in the passageway through the inner stream portion.

The method in accordance with the present invention is preferably carried out with viscous and viscoelastic flowable materials, however, is not limited to the extent that the fluid may not be viscous or viscoelastic, then the injection of air into a discharge passageway can serve to extrude with the allotment of air fluid within the passageway downstream from the point of injection of the air as can have the advantage of clearing the discharge outlet of fluid. The present invention is particularly advantageous for use of fluids which are viscous or viscoelastic. The extent to which the viscous or viscoelastic fluid will have an impact on whether an air bubble may be formed in the discharge passageway by the injection of air. The creation of an air bubble and its subsequent sudden violent discharge can be of substantial assistance in providing for a complete severance of viscous and viscoelastic fluids.

Preferably, the method is carried out wherein after injecting the allotment of air into the passageway so as to substantially sever the inner stream portion from the outer stream portion, then drawing the inner stream portion of the fluid stream longitudinally inwardly and upwardly within the discharge passageway to assist in severing the inner stream portion from the outer stream portion.

The method may be carried out using a pump which is operated to pass the fluid longitudinally outwardly through an elongate discharge passageway with the pump preferably comprising a piston pump having a piston-forming element reciprocally removable relative to a piston chamber-forming body to pass fluid longitudinally through the passageway. Preferably, the injection of the allotment of air is via an air port opening into the passageway and, optionally, after injecting the allotment of air into the passageway, the method is carried out to draw air back via the air port from the passageway. Preferably, after injecting the allotment of air into the passageway so as to substantially sever the inner stream portion from the outer stream portion, the pump is operated to drawback the inner stream portion of the fluid stream longitudinally inwardly within the passageway.

The invention provides an advantageous piston pump assembly in which the piston has a two-piece construction which selectively collapses during a stroke of operation as to discharge fluid during an initial segment of movement in one stroke and to then discharge air in a later segment of a stroke, preferably a retraction stroke. The piston pump in accordance with the present invention can be manually operated or operated by an automatic motor powered actuator. Use of a motor powered actuator is advantageous so as to ensure that the pump is cycled through a full cycle of operation.

The method in accordance with the present invention is preferably operated such that the injection of the allotment of air forms an air bubble in the passageway, which air bubble preferably extends across a substantial portion of the cross-section of the passageway and, more preferably, with the air bubble extending from within the passageway to at least partially outwardly of the discharge opening of the passageway. The method may be also carried out such that an air bubble is formed by the allotment of air to extend at least partially outwardly of the discharge opening and while the air bubble extends outwardly of the discharge opening collapsing the bubble preferably suddenly as by continued injection of air to enlarge the bubble outwardly of the discharge opening so that it collapses. Drawing air back via the air port from the passageway and/or drawing the inner stream portion of the fluid stream longitudinally inwardly and upwardly within the passageway are other methodologies used towards assisting in stressing, breaking or collapsing the bubble and severing any remaining fluid connecting the inner stream portion from the outer stream portion after collapse of the bubble. Relatively sudden collapse of the air bubble can be violent and, for example, generate sound pressures which are believed to assist in severing the walls of the bubble which otherwise would join the inner stream portion and the outer stream portion.

The method in accordance with the present invention may be carried out in a wide manner of different mechanisms preferred of which comprise piston pumps. The invention is not limited to the use of piston pumps.

In one aspect, the present invention provides a method of dispensing a fluid comprising:

passing fluid longitudinally outwardly and downwardly through an elongate discharge passageway as a fluid stream to thereby dispense downwardly the stream at a downwardly directed discharge outlet of the passageway open to the atmosphere, and injecting an allotment of air into the passageway proximate the discharge outlet of a volume sufficient to substantially sever an inner stream portion of the fluid stream inward of the injected allotment of air from an outer stream portion of the fluid stream outward of the injected allotment of air.

In another aspect, the present invention provides a piston pump comprising a piston chamber-forming body and a piston element reciprocally slidable relative the body about an axis, the piston element including a sleeve portion and a tube portion, the sleeve portion disposed coaxially about the axis annularly about the tube portion, the tube portion coaxially slidable along the axis relative the sleeve portion, the tube portion having an elongate discharge passageway and a discharge outlet, the sleeve portion coaxially slidable relative the body along the axis between a retracted position and extended position, the tube portion captured for axial between the sleeve portion and the body such that relative outward sliding of the tube portion on the sleeve is limited to an outer position relative the sleeve portion by engagement of an outwardly directed stop surface on the tube portion with an inwardly directed stop surface on the sleeve portion and relative inward sliding of the tube portion relative the body is limited to an inner position relative the body by engagement of an inwardly directed stop surface of the tube portion with an outwardly directed stop surface on the body, in sliding of the sleeve portion inwardly relative the body from the extended position toward the retracted position, the sleeve portion moves the tube portion inwardly from the outer position to the inner position with, when the tube portion is in the inner position relative the sleeve portion, the sleeve portion is in a partially retracted position intermediate the extended position and the retracted position, in sliding of the sleeve portion inwardly from the partially retracted position to the retracted position the sleeve portion moves inwardly relative both the body and the tube portion, a fluid compartment selected from the group consisting of a fluid compartment defined between the body and the tube portion and a fluid compartment defined between the body, the tube portion and the sleeve, the fluid compartment in communication with a fluid in a reservoir by a one-way valve permitting fluid flow outwardly from the reservoir to the fluid compartment but preventing fluid flow inwardly, an air compartment selected from the group of an air compartment defined between the tube portion and the sleeve portion and an air compartment defined between the sleeve portion and the body, on sliding of the sleeve portion inwardly from the extended position to the partially retracted position with the sleeve portion moving the tube portion inwardly from the outer position to the inner position, a volume of the fluid compartment is reduced discharging fluid from the fluid compartment as a fluid stream through the passageway of the tube portion and out the discharge opening, on sliding of the sleeve portion inwardly from the partially retracted position to the retracted position, a volume of the air compartment is reduced discharging air from the air compartment into the fluid stream in the elongate discharge passageway, on sliding of the sleeve portion outwardly from the fully retracted position to the partially retracted position, the volume of the air compartment increases drawing air into the air compartment, and on sliding of the sleeve portion outwardly from the partially retracted position toward the extended position, the tube portion moves outwardly toward the outer position and the volume of the fluid chamber increases drawing fluid from the fluid reservoir past the one way valve into the fluid chamber. Preferably, the piston pump as includes a spring member biasing the sleeve portion biased outwardly relative the tube portion. Preferably in the piston pump, the sleeve portion carries an engagement flange for engagement by an actuator adapted to slide the sleeve portion relative the body.

In yet another aspect, the present invention provides a piston pump comprising a piston chamber forming body and a piston element reciprocally slidable relative the body about an axis, the piston element including a sleeve portion and a tube portion, the sleeve portion coaxially slidable relative the body along the axis between a fully retracted position and extended position, the tube portion coaxially slidable relative the body along the axis and coaxially slidable relative the sleeve portion between an outer position and an inner position to discharge fluid through a passageway and out a discharge outlet, the body engaging the tube portion to prevent inward movement of the tube portion relative the body past the inner position, the sleeve portion engaging the tube portion to prevent outward movement of the tube portion relative the body past the outer position, wherein on sliding of the sleeve portion inwardly from the extended position toward the fully retracted position, the sleeve portion moves the tube portion inwardly from the outer position to the inner position and movement of the tube portion inwardly from the outer position to the inner position discharges fluid as a fluid stream through the passageway and out a discharge opening, wherein on sliding of the sleeve portion inwardly from the extended position toward the fully retracted position on the tube portion reaching the inner position the sleeve portion is in a partially retracted position intermediate the extended position and the retracted position, wherein on sliding of the sleeve portion inwardly from the partially retracted position to the fully retracted position, the sleeve portion moves coaxially inwardly relative to both the body and to the tube portion and discharges air into the fluid stream in the elongate discharge passageway.

In yet another aspect, the present invention provides a fluid discharge nozzle providing a passageway for passage of a stream of fluid to an outlet and providing for air to be discharged into the fluid stream to assist in severing the fluid stream. Preferably, the passageway is provided within a hollow tubular stem and a tube is provided concentrically about the stem to selectively deliver air from coaxially between the stem and the tube into the fluid stream while the fluid is constrained within the stem and/or the tube.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
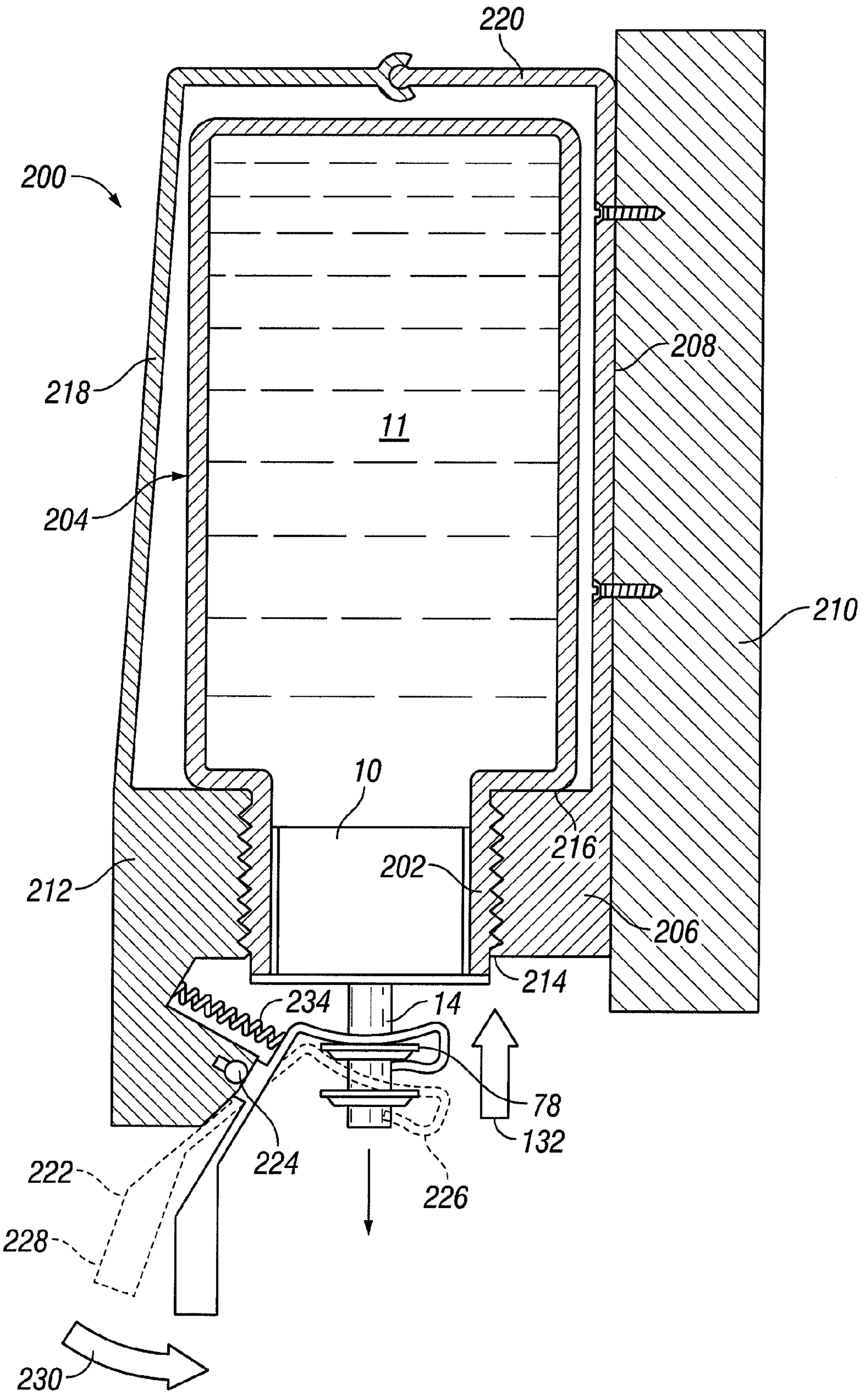
FIG. 1 is a partially cut-away side view of a first embodiment of a liquid dispenser with a reservoir and a pump assembly in accordance with the present invention.

Reference is now made to FIG. 1 which shows a liquid soap dispenser generally indicated 200 utilizing a pump assembly 10 coupled to the neck 202 of a sealed, collapsible container or reservoir 204 containing liquid hand soap 11 to be dispensed. Dispenser 200 has a housing generally indicated 206 to receive and support the pump assembly 10 and the reservoir 204. Housing 206 is shown with a back plate 208 for mounting the housing, for example, to a building wall 210. A bottom support plate 212 extends forwardly from the back plate to support and receive the reservoir 204 and pump assembly 10. The pump assembly 10 is only schematically shown in FIG. 1, as including a slidable piston 14. As shown, bottom support plate 212 has a circular opening 214 therethrough. The reservoir 204 sits supported on a shoulder 216 of the support plate 212 with the neck 202 of the reservoir 204 extending through the opening 214 and secured in the opening as by a friction fit, clamping and the like. A cover member 218 is hinged to an upper forward extension 220 of the back plate 208 so as to permit replacement of reservoir 202 and its pump assembly 10.

Support plate 212 carries at a forward portion thereof an actuating lever 222 journalled for pivoting about a horizontal axis at 224. An upper end of the lever 222 carries a hook 226 to engage an engagement disc 78 carried on the piston 14 of the piston pump 10 and couple the lever 222 to piston 14 such that movement of the lower handle end 228 of lever 222 from the dashed line position to the solid line position, in the direction indicated by arrow 230 slides piston 14 inwardly in a retraction or discharge pumping stroke as indicated by arrow 232. On release of the lower handle end 228, a spring 234 biases the upper portion of lever 222 downwardly so that the lever draws piston 14 outwardly to a fully withdrawn position as seen in dashed lines in FIG. 1. Lever 222 and its inner hook 226 are adapted to permit manual coupling and uncoupling of the hook 226 as is necessary to remove and replace reservoir 204 and pump assembly 10. Other mechanisms for moving the piston 14 can be provided including mechanised and motorized mechanisms.

In use of the dispenser 200, once exhausted, the empty, collapsed reservoir 204 together with the attached pump assembly 10 are preferably removed and a new reservoir 204 and attached pump assembly 10 may be inserted into the housing.

Reference is made first to FIGS. 2 to 15 which schematically illustrate a pump assembly 10 in accordance with a first embodiment of the present invention generally adapted to be used as the pump assembly 10 shown in FIG. 1.

The pump assembly 10 comprises three principle elements, a piston chamber-forming body 12, a piston-forming element or a piston 14, and a one-way inlet valve 16. The body 12 carries an outer annular flange 18 with internal threads 20 which are adapted to engage threads of the neck 202 of a bottle reservoir 204 shown in dashed lines only in FIG. 2.

The body 12 includes an interior center tube 22 which defines a cylindrical chamber 24 therein. The chamber 24 has a chamber wall 26 being the inside surface of the center tube 22 and extends axially from an inner end 28 outwardly to an outer end at the axially outwardly directed end surface 30 of the center tube 22. The chamber wall 26 is cylindrical.

The body 12, center tube 22 and chamber 24 are coaxially about a central axis 32.

An end flange 34 extends across the inner end 28 of the chamber 24 and has a central opening 36 and a plurality of inlet orifices 38 therethrough. The one-way valve 16 is disposed across the inlet openings 38. The inlet orifices 38 provide communication through the flange 34 with fluid in the reservoir 204. The one-way valve 16 permits fluid flow from the reservoir 204 into the chamber 24 but prevents fluid flow from the chamber 24 to the reservoir 204.

The one-way valve 16 comprises a shouldered button 40 which is secured in snap-fit relation inside the central opening 36 in the flange 34 with a circular resilient flexing disc 42 extending radially from the button 40. The flexing disc 42 is sized to circumferentially abut the chamber wall 26 of the chamber 24 substantially preventing fluid flow therepast inwardly from the chamber 24 to the reservoir 204. The flexing disc 42 is deflectable away from the wall 26 to permit flow therepast outwardly from the reservoir 204 into the chamber 24.

Figure 6:
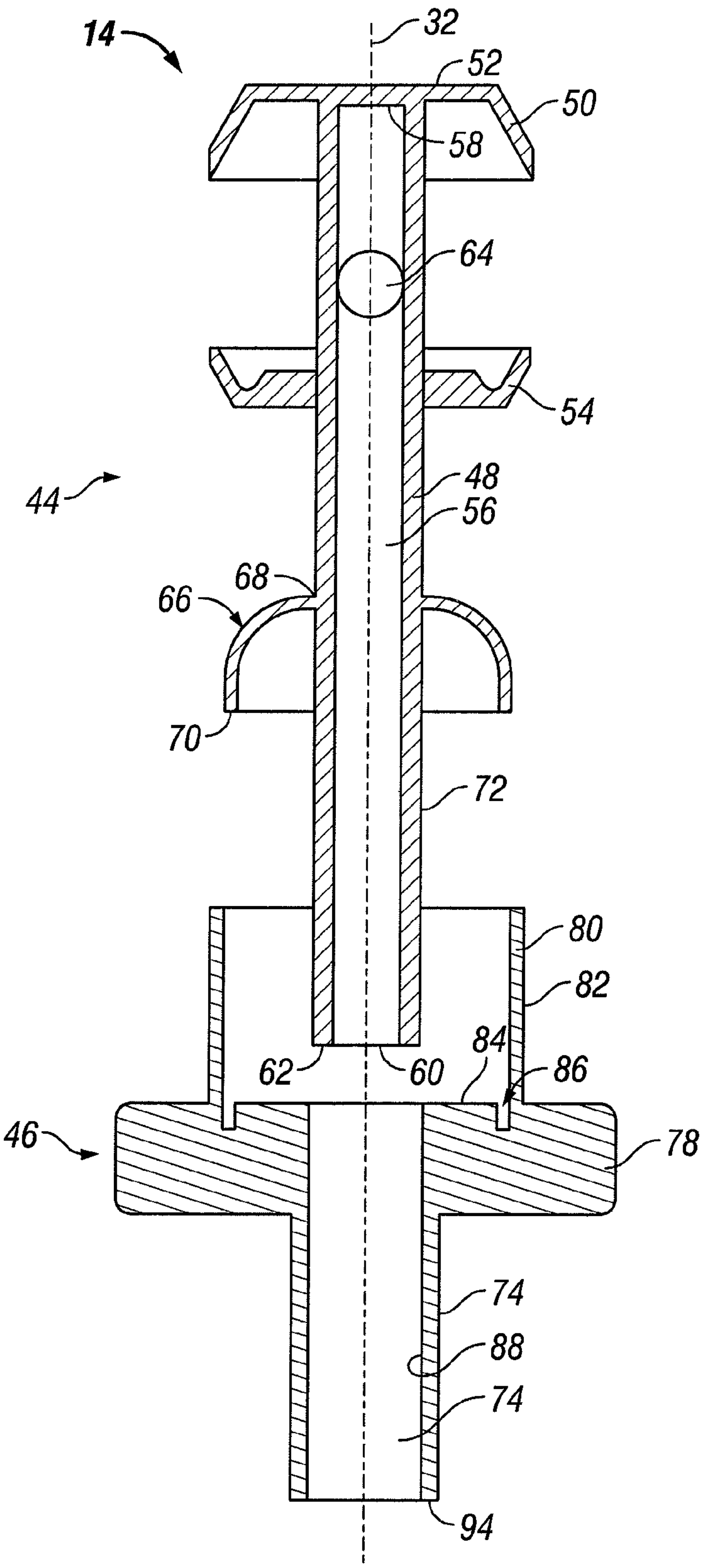
FIG. 6 is a cross-sectional exploded side view of the piston of the pump of FIG. 2.
Figure 7:
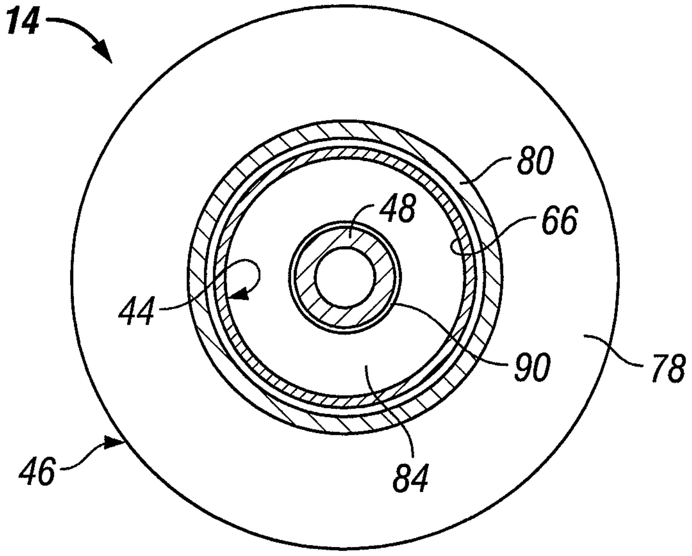
FIG. 7 is a cross-sectional view along section line 7-7' in FIG. 2.

The piston 14 is axially slidably received in the chamber 24 for reciprocal coaxial sliding inwardly and outwardly therein. The piston 14 is generally circular in cross-section as seen in FIG. 7. As best seen in FIG. 6, the piston 14 is formed from two elements, namely, a stem portion 44 and a sleeve portion 46. The stem portion 44 has a hollow stem 48 extending along the central longitudinal axis 32 through the piston 14.

A generally circular resilient flexing inner disc 50 is located at an inner end 52 of the stem portion 44 and extends radially therefrom. The inner disc 50 is adapted to be located in the chamber 24 with the inner disc 50 extending radially outwardly on the stem 48 to circumferentially engage the chamber wall 26. The inner disc 50 is sized to circumferentially abut the chamber wall 26 of the chamber 24 to substantially prevent fluid flow therebetween inwardly. The inner disc 50 is preferably biased radially outwardly and is adapted to be deflected radially inwardly so as to permit fluid flow past the inner disc 50 outwardly.

A generally circular outer disc 54 is located on the stem 48 spaced axially outwardly from the flexing disc 50. The outer disc 54 is adapted to be located in the chamber 24 with the outer disc 54 extending radially outwardly on the stem 48 to circumferentially engage the chamber wall 26 of the chamber 24. The outer disc 54 is sized to circumferentially abut the chamber wall 26 of the chamber 24 to substantially prevent fluid flow therebetween outwardly. The outer disc 54 is preferably biased radially outwardly and may optionally be adapted to be deflected radially inwardly so as to permit fluid flow past the outer disc 54 inwardly. Preferably, the outer disc 54 engages the chamber wall 26 of the chamber 24 to prevent flow therepast both inwardly and outwardly.

The piston stem 48 has a hollow central outlet passageway 56 extending along the axis of the piston stem from a closed inner end 58 to a discharge outlet 60 at an outer end 62 of the stem portion 44. An outlet opening 64 extends radially through the stem 48 into communication with the central passageway 56. The outlet opening 64 is located on the side of the stem 48 between the inner disc 50 and the outer disc 54. The outlet opening 64 and central passageway 56 permit fluid communication through the piston 14 past the outer disc 54 between the outlet opening 64 and the outlet 60.

The stem portion 44 carries on the stem 48 outwardly of the outer disc 54 a resilient spring bellows disc 66 comprising a thin walled disc joined at a radially inner end 68 to the stem 48 and extending radially outwardly and axially outwardly to an outer end 70 such that the bellows disc 66 has a bell or cup shape opening outwardly. Outwardly of the inner end 68 of the bellows disc 66, the stem 48 has an outer wall 72 which is cylindrical where it extends from the bellows disc 66 to the outer end 62.

Figure 8:
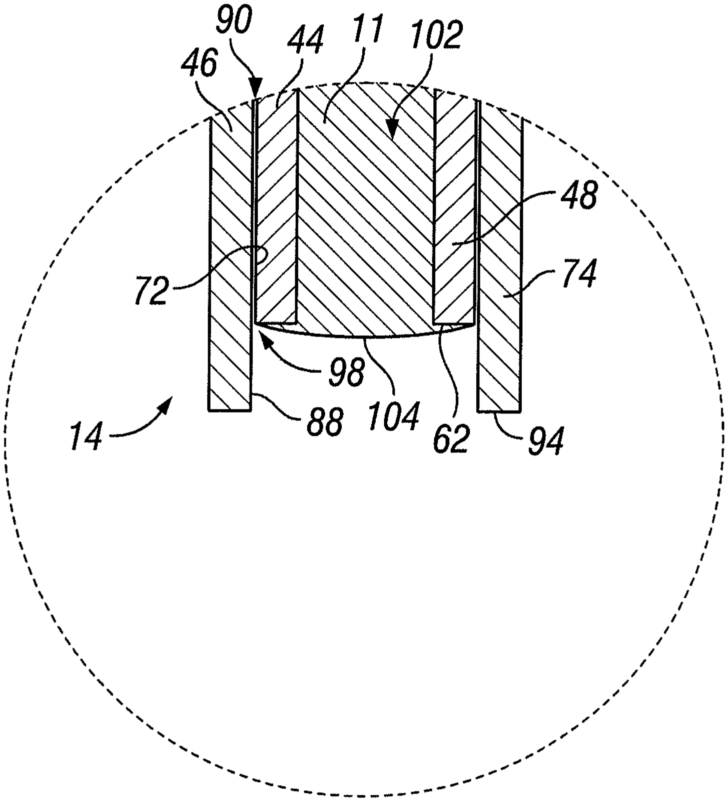
FIG. 8 is an enlarged cross-sectional side view of the pump assembly of FIG. 2 within the broken line circle indicated in FIG. 2 but additionally showing fluid being dispensed.

As best seen in FIG. 6, the sleeve portion 46 comprises a tube 74 with a central bore 76 therethrough coaxial about the axis 32. The bore 76 through the tube 74 has a radially inwardly directed interior surface 88 sized to permit the stem 48 of the stem portion 44 outwardly of the bellows disc 66 to be received therein and to be relatively slidable coaxially. As best seen in FIG. 8, the relative diameters of the interior surface 88 of the tube 74 and the outer wall 72 of the stem 48 provide an axially extending substantially annular passageway 90 therebetween. The tube 74 has the engagement flange 78 extend radially outwardly therefrom. The engagement flange 78 is adapted to be engaged by an actuating device, such as the lever 222 in FIG. 1, in order to move the sleeve portion 46 and hence the piston 14 in and out of the body 12.

A centering ring 82 extends axially inwardly from the engagement flange 78 coaxially about the axis 32 and presents a radially outwardly directed cylindrical wall surface 82 for engagement with the chamber wall 26 of the chamber 24 so as to assist in maintaining the sleeve portion 46 coaxially disposed within the chamber 26 of the body 12. An annular axially inwardly directed shoulder surface 84 of the sleeve portion 46 is provided radially inwardly of the centering ring 80 and carries a circular axially outwardly extending slot 86 open axially inwardly.

From the exploded condition of the stem portion 44 and the sleeve portion 46 as shown in FIG. 6, these elements are assembled into the piston 14 by sliding the outer end 62 of the stem 48 of the stem portion 44 axially into the bore 76 of the sleeve portion 46 so as to receive the outer end 70 of the bellows disc 66 within the slot 86 carried on the shoulder surface 84 of the sleeve portion 46. The outer end 70 of the bellows disc 66 is secured in the slot 86 against removal as, for example, by the use of an adhesive. In the assembled piston as shown, for example, in FIG. 2, an annular inner air compartment 92 is defined within inside of the bellows disc 66 and bordered by the axially inwardly directed shoulder surface 84 of the sleeve portion 46 and the outer wall of the stem 48. The air compartment 92 is open outwardly via the annular passageway 90 between the tube 74 and the stem 48. For ease of illustration, the annular passageway 90 is generally not shown other than in the enlarged view of FIGS. 8 to 15.

Figure 2:
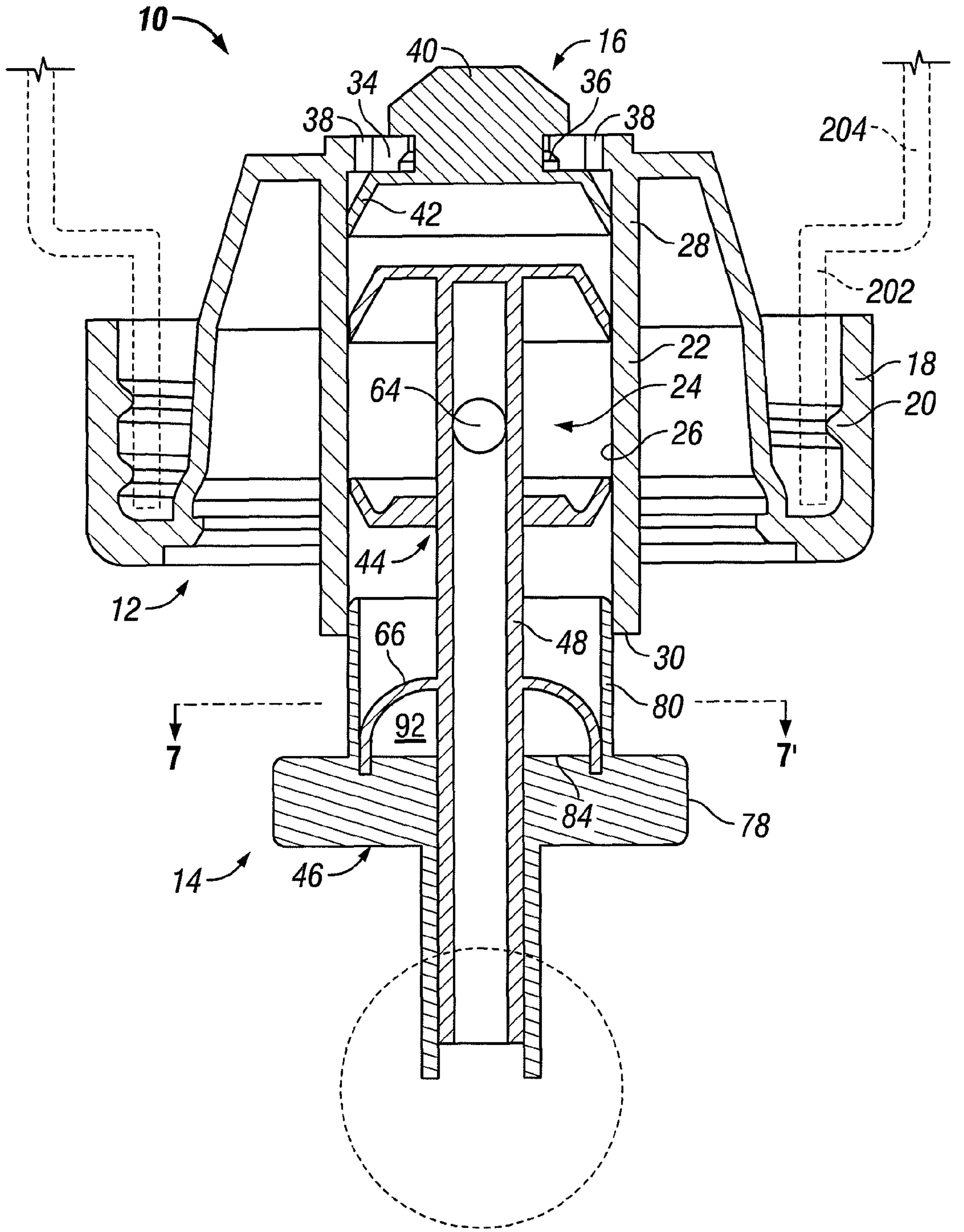
FIG. 2 is a schematic cross-sectioned side view of a pump assembly in accordance with a first embodiment of the present invention is a fully extended position.
Figure 3:
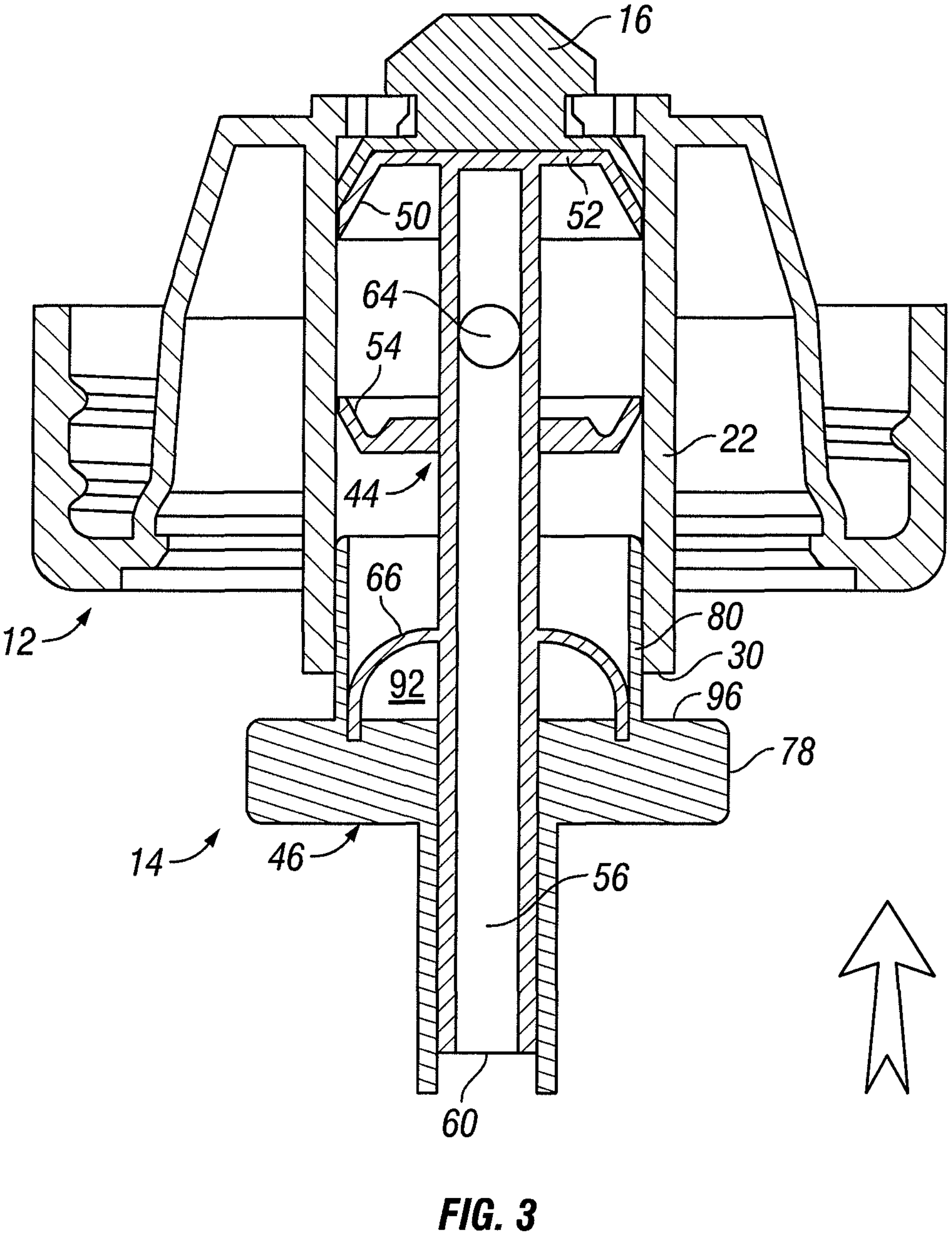
FIG. 3 is a cross-sectional side view of the pump assembly of FIG. 2 in a partially retracted position in a retraction stroke.
Figure 4:
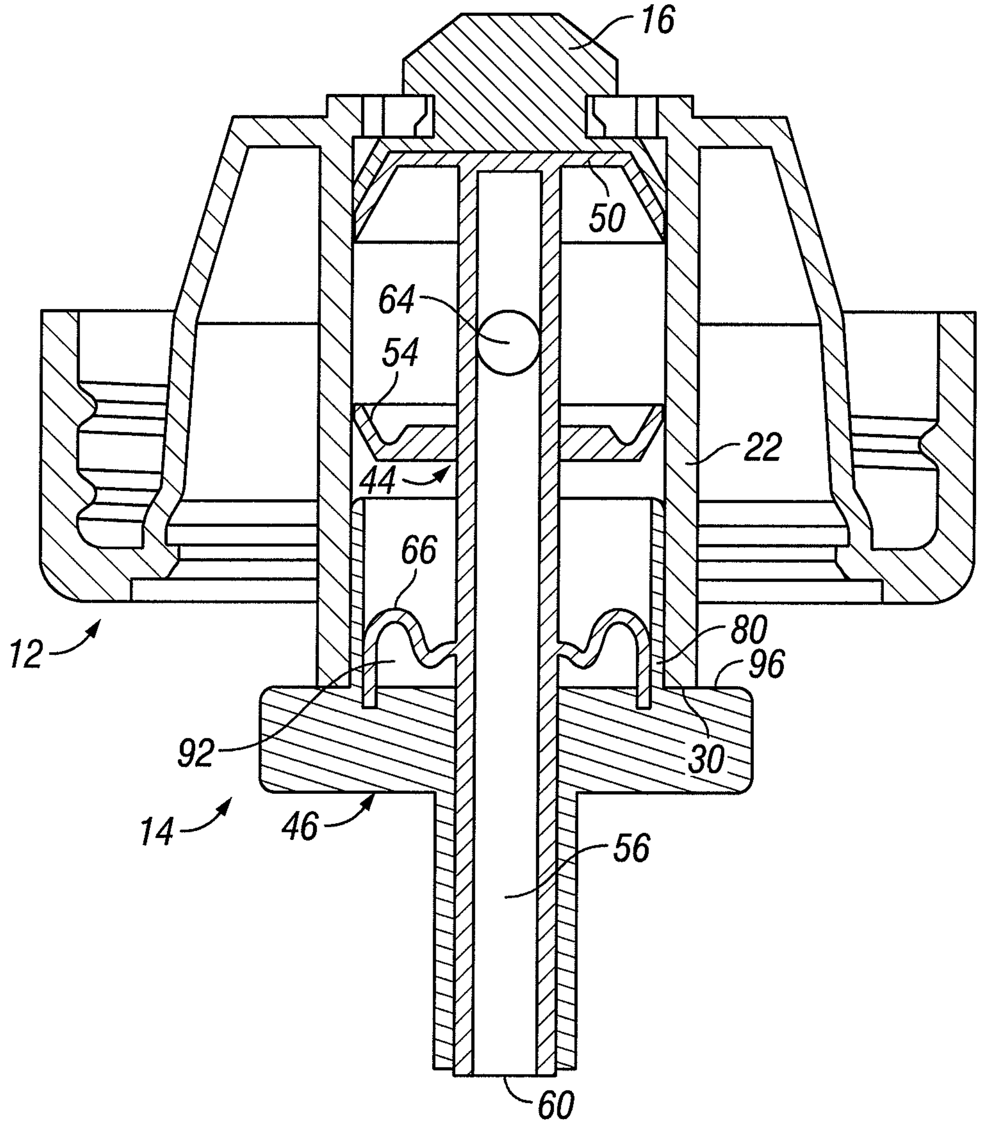
FIG. 4 is a cross-sectional side view of the pump of FIG. 2 in a fully retracted position.
Figure 5:
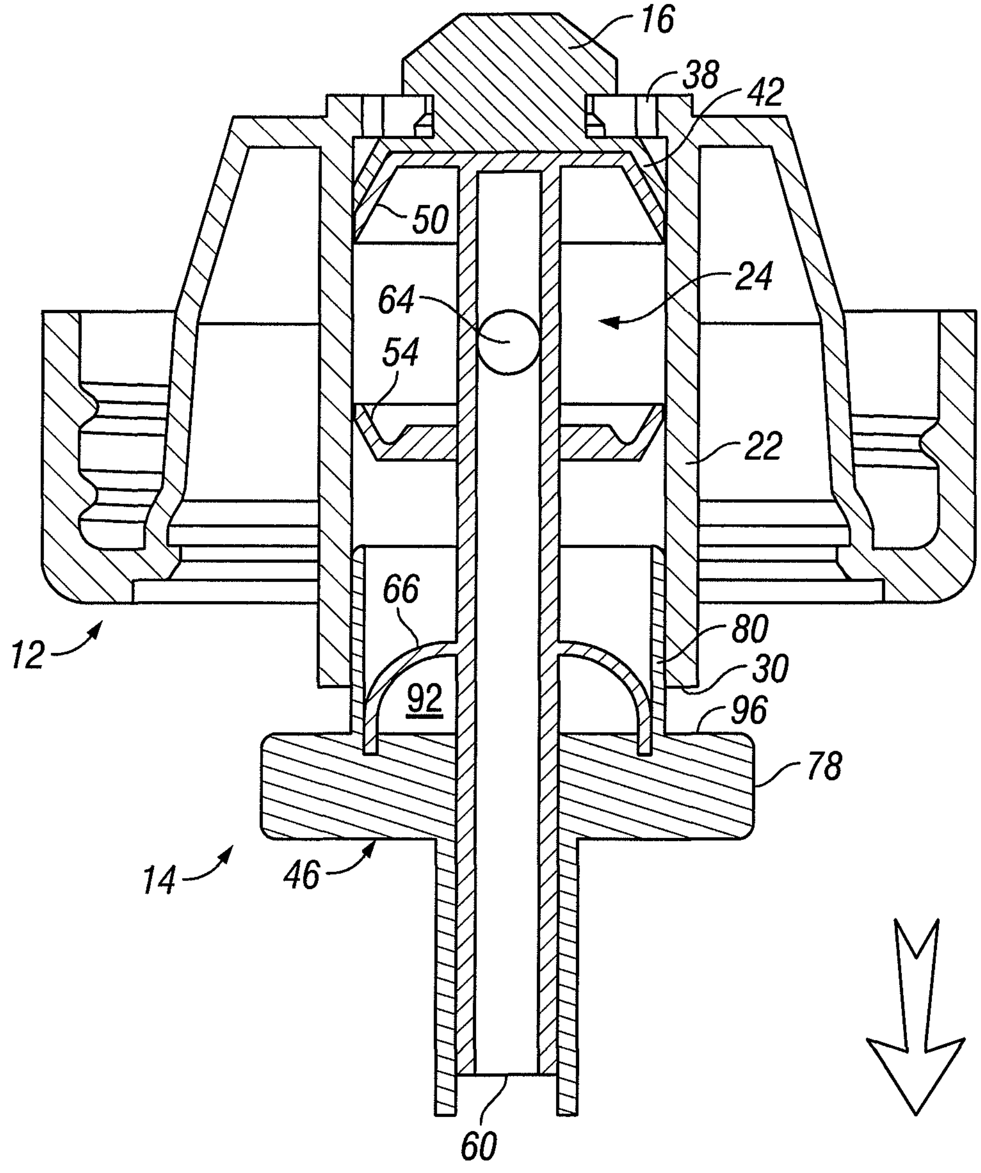
FIG. 5 is a cross sectional side view of the pump assembly of FIG. 2 in a partially retracted position in a withdrawal stroke.

The pump assembly 10 is operative to dispense fluid 11 from the reservoir 204 in a cycle of operation in which the piston 14 is reciprocally slidable coaxially within the chamber 24 and with the cycle of operation involving a retraction stroke and a withdrawal stroke. Such a cycle of operation is illustrated having regard to FIGS. 2 to 5 with FIG. 2 representing a fully withdrawn position and FIG. 4 representing a fully retracted position and each of FIGS. 3 and 5 representing partially retracted positions. A retraction stroke is indicated by movement of the piston 14 relative the body 12 from the position of FIG. 2 axially inwardly to the partially retracted position of FIG. 3 and then axially inwardly to the fully retracted position of FIG. 4. A withdrawal stroke is indicated by movement of the piston 14 relative the body 12 from the fully retracted position of FIG. 4 axially outwardly to the partially retracted position of FIG. 5 and then axially inwardly to the fully extended position shown of FIG. 2. On movement from the fully extended position of FIG. 2 to the partially retracted position of FIG. 3, axially inward movement of the sleeve portion 46 is transferred via the bellows disc 66 to the stem portion 44 to move the stem portion 44 axially inwardly until, as shown in FIG. 3, the inner end 52 of the stem 48 engages the one-way valve 16 and further inward movement of the stem portion 44 is prevented. In the retraction stroke in moving from the fully extended position of FIG. 2 to the partially retracted position of FIG. 3, the bellows disc 66 transfers forces from the sleeve portion 46 to the stem portion 44 such that the sleeve portion 46 and stem portion 44 move in unison together inwardly substantially without relative movement thus moving the stem portion 44 inwardly without a change in the volume of the air compartment 92. In the position of FIG. 3, an axially inwardly directed stop surface 96 on the engagement flange 78 radially outwardly of the centering ring 80 is axially spaced from the outer end 30 of the center tube 22 of the body 12. On axial inward movement of the sleeve portion 46 from the position of FIG. 3 to the position of FIG. 4, the sleeve portion 46 moves axially relative to both the stem portion 44 and the body 12 until the stop surface 96 on the engagement flange 78 engages the outer end 30 of the center tube 22 of the body 12. In moving inwardly from the position of FIG. 3 to the position of FIG. 4, the bellows disc 66 is deformed from a bell shaped uncollapsed configuration shown in FIG. 3 to a collapsed configuration shown in FIG. 4 and such collapse of the bellows disc 66 reduces the volume of the air compartment 92 thus discharging air outwardly from the air compartment 92 through the annular passageway 90 to exit the annular passageway at an annular outlet 98 between the tube 74 and the stem 48.

In the withdrawal stroke on movement from the fully retracted position of FIG. 4 to the partially retracted position of FIG. 5, the sleeve portion 46 moves axially outwardly relative to both the stem portion 44 and the body 12. In such outward movement from the position of FIG. 4 to the position of FIG. 5, the bellow disc 66 moves from the collapsed condition as shown in FIG. 4 to the uncollapsed condition shown in FIG. 5 and, in so doing, increases the volume of the air compartment 92 resulting with a drawing in of air through the annular outlet 98 via the annular passageway 90 into the air compartment 92. In the withdrawal stroke in moving from the partially retracted position of FIG. 5 to the fully extended position of FIG. 2, the bellows disc 66 transfers forces from the sleeve portion 46 to the stem portion 44 such that the sleeve portion 46 and stem portion 44 move in unison together outwardly substantially without relative movement thus moving the stem portion 44 outwardly without a change in the volume of the air compartment 92.

Movement of the stem portion 44 relative to the body 12 in the retraction stroke in moving from the position of FIG. 2 to the position of FIG. 3 provides for discharge of fluid from the chamber 24 outwardly through the discharge outlet 60 of the outlet passageway 56. In this regard from the position of FIG. 2 on movement of the stem portion 44 inwardly, fluid in the chamber 26 between the one-way valve 16 and the inner disc 50 is pressurized, deflecting the inner disc 50 so as to permit fluid to flow outwardly past the inner disc 50 and into an annular space within the chamber 24 between the inner disc 50 and the outer disc 54 and hence via the outlet opening 64 into the outlet passageway 56 and axially through the outlet passageway 56 to exit the discharge outlet 60. In the withdrawal stroke, on movement of the stem portion 44 from the position of FIG. 5 to the position of FIG. 2, a vacuum is created within the chamber 24 between the inner disc 50 and the one-way valve 16 which deflects the disc 42 of the one-way valve 16 to permit fluid flow outwardly therepast such that fluid flows from the reservoir 204 through the inlet orifices 38 into the chamber 24.

In a cycle of operation, in a retraction stroke on moving from the fully extended position of FIG. 2 to the position of FIG. 3, fluid is discharged from the discharge outlet 60 and the volume of the air compartment 92 is maintained substantially constant. In movement from the position of FIG. 3 to the fully retracted position of FIG. 4, air is discharged from the air compartment 92 via the annular outlet 98 and fluid is not substantially discharged out or drawn back in through the outlet opening 60. In a withdrawal stroke in moving from the position of FIG. 4 to the position of FIG. 5, air is drawn into the air compartment 92 via the annular outlet 98 and fluid is not substantially drawn in back or discharged out through the outlet opening 60. In moving from the position of FIG. 5 to the fully extended position of FIG. 2, fluid is drawn into the chamber 24 from the reservoir 204 without fluid being dispensed out the discharge outlet 60.

Reference is made to FIGS. 8 to 15 which each show an exploded view of the outlet end of the piston 14 as shown within the circle of dashed lines in FIG. 2, however, additionally schematically showing a stream 102 of the fluid 11 as it is discharged in conjunction with air discharged from the air compartment 92. FIGS. 8 to 15 represent successive steps in a cycle of operation of the piston pump.

Figure 14:
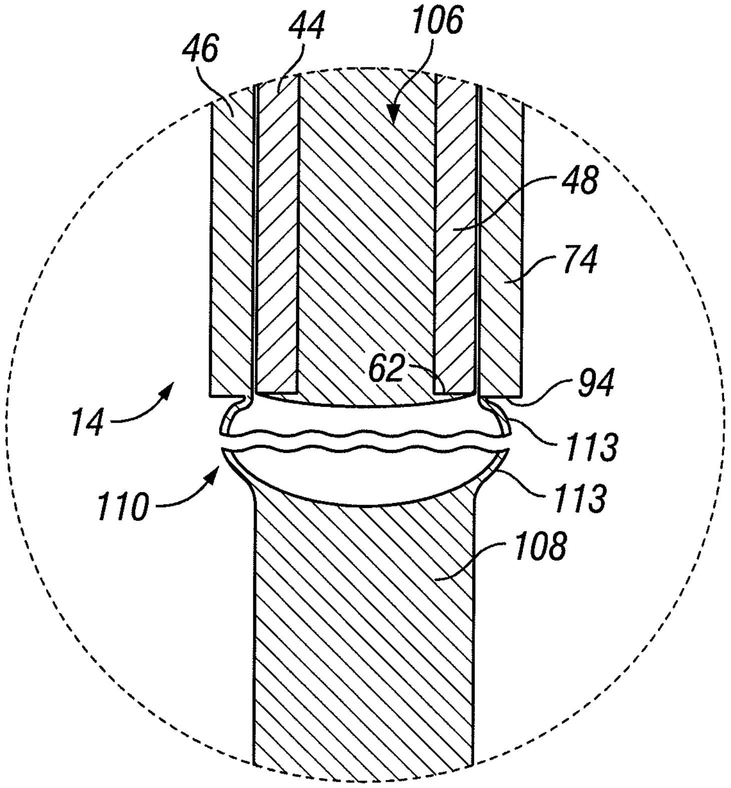
FIG. 14 is an enlarged cross-sectional side view the same as in FIG. 8 showing a condition with the pump assembly in a retraction stroke with the fully retracted position of FIG. 4.
Figure 15:
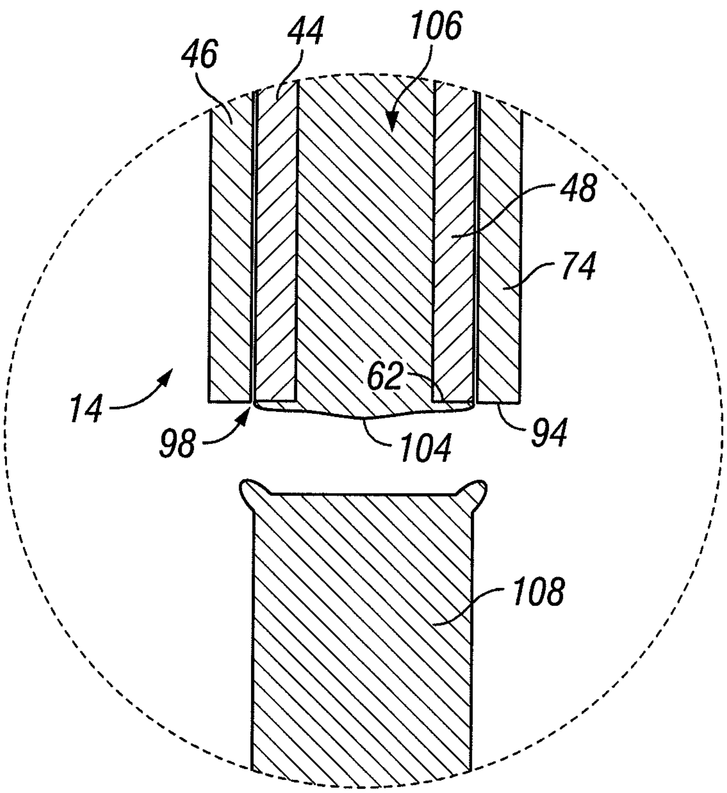
FIG. 15 is an enlarged side view the same as FIG. 8 showing a condition with the pump assembly in a withdrawal stroke in a position between the position of FIG. 4 and FIG. 5.

FIG. 8 illustrates the relative condition of the stem 48 and the tube 74 in a fully extended position as shown in FIG. 2. In this position, the stem 48 may be considered to be fully retracted compared to the tube 74. FIG. 14 illustrates a condition as shown in FIG. 4 in which the piston 14 is fully retracted relative to the body 12 and correspondingly the stem 48 is fully extended relative to the tube 74. Thus, FIGS. 8 and 14 represent the extreme positions of relative movement of the stem 48 relative to the tube 74. This relative position of extension of the tube 74 relative to the stem 48 is for discussion to be considered defined as a 100% position in FIG. 14 and the relative position of extension of the tube 74 relative to the stem 48 is to be defined as a 0% position in FIG. 8. The relative extension positions of the tube 74 relative to the stem 48 are a 0% position in FIG. 8, a 0% position in FIG. 9, a 20% position in FIG. 10, a 35% position in FIG. 11, a 65% position in FIG. 12, an 80% position in FIG. 13, a 100% position in FIG. 14 and an 80% position in FIG. 15. In moving from the position of FIG. 2 to the position of FIG. 4, FIGS. 8 to 14 in sequence represent the relative percentage movement of the tube 74 relative to the stem 48. FIG. 15 represents a position assumed in movement from the fully retracted position of FIG. 4 towards the partially retracted position of FIG. 5.

The representations of FIGS. 8 to 15 are intended to schematically illustrate one possible explanation for operation of the first embodiment of the pump in accordance with the present invention as observed by the applicant by simple experiment when dispensing a viscous liquid hand cream.

Referring to FIG. 8, FIG. 8 illustrates an initial condition of the pump 10 as shown in FIG. 2 in which condition the pump may rest between cycles of operation. As seen in FIG. 8, the stream 102 of fluid fills the stem 48 to its outer end 62 and provides a meniscus 104 facing downwards. On movement from the position of FIG. 2 to the position of FIG. 3, the stream 102 of fluid is discharged from and extends out of the outer end 62 of the stem 48 downwardly through the outer end 94 of the tube 74. The stream 102 may be considered to comprise an inner portion 106 within the stem 48 and an outer portion 108 downward from the stem 48.

Figure 10:
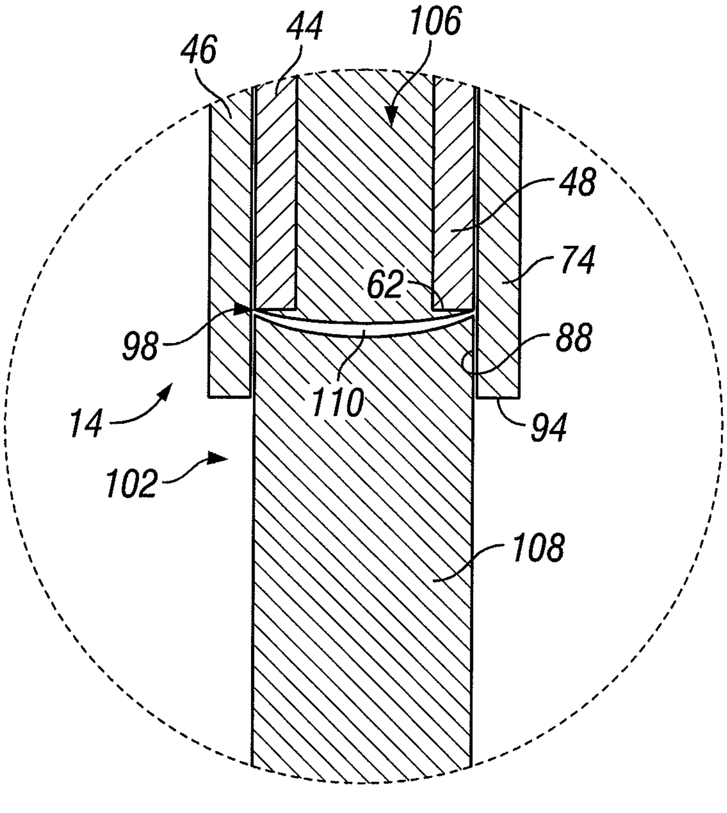
FIG. 10 is an enlarged cross-sectional side view the same as in FIG. 8 showing a condition with the pump assembly in a retraction stroke in a first retracted position between the partially retracted position of FIG. 3 and the fully retracted position of FIG. 4.

FIG. 10 illustrates a condition in the retraction stroke in which the sleeve portion 46 has been moved upwardly relative to the stem portion 44, 20% of the total axial amount that the sleeve portion 46 can move relative to the stem portion 44. With movement of the sleeve portion 46 upwardly relative the stem portion 44, the bellows disc 66 is partially collapsed such that the volume of the air compartment 92 is reduced and a volume of air has been ejected out the annular outlet 98 and inside the tube 74 at the outer end 62 of the stem 48. This ejected air is schematically illustrated as forming a pocket or bubble 110 of air within the fluid stream 102 within the tube 74. As well, with the relative upward and axially inward movement of the tube 74, there is a tendency for engagement between the fluid stream 102 and the interior surface 88 of the tube 74 to attempt to draw the fluid stream 102 upwardly into the outer end 62 of the stem 48. This upward drawing of the liquid stream 102 may be of assistance in engaging the fluid stream with the inner surface 88 of the tube 74 as can be of assistance towards having the air bubble 110 in being formed to extending radially into the fluid stream 102 as contrasted with merely passing axially outwardly through the fluid stream to the atmosphere.

Figure 11:
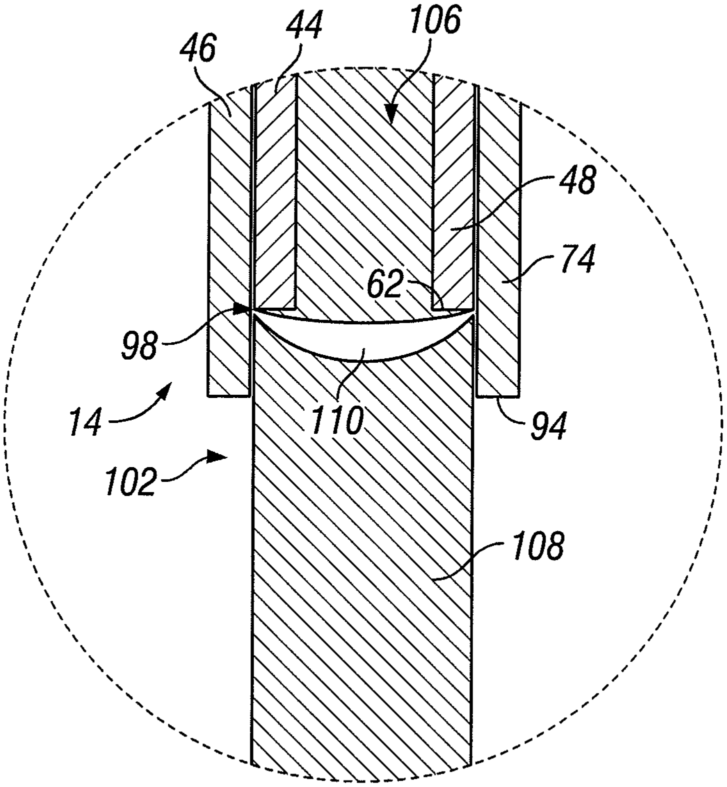
FIG. 11 is an enlarged cross-sectional side view the same as in FIG. 8 showing a condition with the pump assembly in a retraction stroke in a second retracted position between the partially retracted position of FIG. 3 and the fully retracted position of FIG. 4.

FIG. 11 illustrates a condition after further inward movement of the sleeve portion 46 relative to the stem portion 44 from the position of FIG. 10 with additional air being ejected from the air chamber 92 out the annular outlet 98 thus increasing the volume of air in the air bubble 110 and with the tube 74 continuing to be moved axially inwardly relative to the stem 48.

Figure 12:
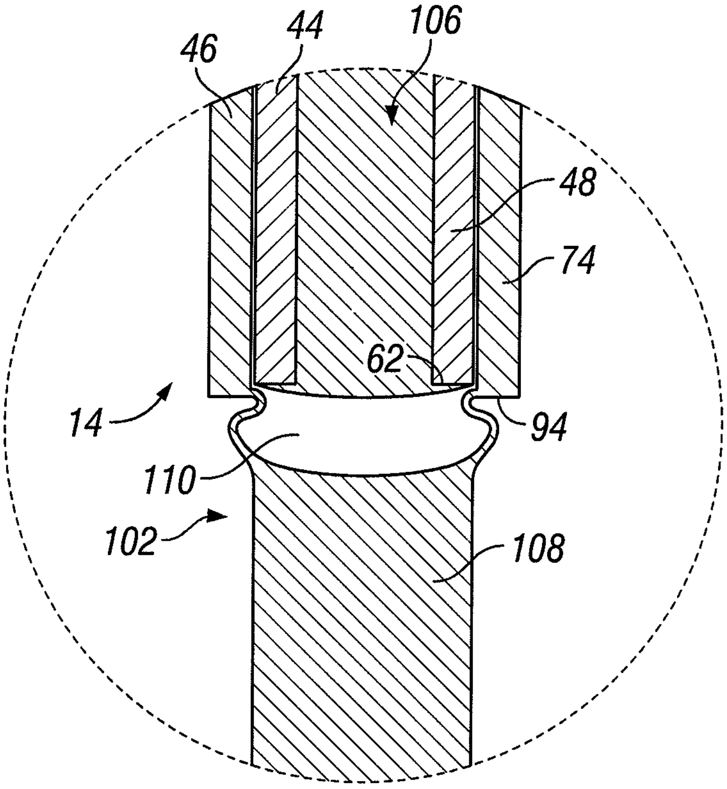
FIG. 12 is an enlarged cross-sectional side view the same as in FIG. 8 showing a condition with the pump assembly in a retraction stroke in a third retracted position between the partially retracted position of FIG. 3 and the fully retracted position of FIG. 4.

FIG. 12 illustrates a condition which arises from the position of FIG. 11 in which the sleeve portion 46 further moves axially upwardly relative to the stem portion 44 with the volume of the air compartment 92 continuing to be reduced and additional air being injected to increase the size of the air bubble 110 and with the air bubble 110 becoming sufficiently large that it has formed a side wall 113 bulging radially outwardly. In FIG. 12, the outer end 62 of the stem 48 continues to be axially inwardly of the tube 74.

Figure 13:
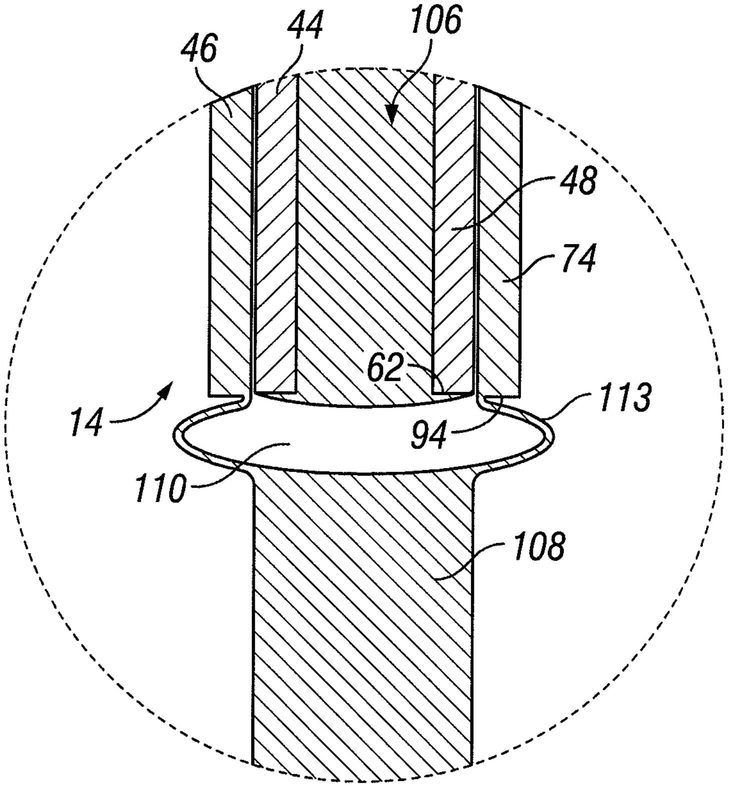
FIG. 13 is an enlarged cross-sectional side view the same as in FIG. 8 showing a condition with the pump assembly in a retraction stroke in a fourth retracted position between the partially retracted position of FIG. 3 and the fully retracted position of FIG. 4.

FIG. 13 illustrates a condition which arises with further relative axial upward movement of the sleeve portion 46 relative to the stem portion 44 such that the volume of the air compartment 92 is reduced ejecting further air into air bubble 110 and with the outer end 62 of the stem 48 shown to be axially aligned with the outlet end 94 of the bore 78. The air bubble 110 is shown as having its wall 113 formed by the fluid about the air bubble at each annular side further expanded radially outwardly beyond the stem 48 and the tube 74.

FIG. 14 illustrates a condition which arises with further relative axial upward movement of the sleeve portion 46 relative to the stem portion 44 such that the volume of air in the air compartment is reduced ejecting further air into the air bubble 110 so that the air bubble 110 has broken at its radially side wall 113. From the position of FIG. 13 in moving to the position of FIG. 14 the sleeve portion 46 has been drawn axially inwardly relative to the stem portion 44 with the outer end 62 of the stem 48 has extended axially outwardly beyond the outer end 94 of the tube 74 presenting the annular outlet 98 for the air axially inwardly of the outer end 62 of the stem 48. The outlet end 94 of the tube 74 has been moved axially upwardly beyond the outer end 62 of the stem 48. Such movement and configuration is believed to be advantageous with the ejection of air for the wall 113 of the bubble 110 at the radial sides of the bubble 110 to become sufficiently thinned and tensioned so as to rupture and collapse as schematically illustrated in FIG. 14.

FIG. 15 illustrates a condition subsequent to FIG. 14 in which from the position of FIG. 14 represented by the fully retracted position of FIG. 4, in a withdrawal stroke, the sleeve portion 46 moves axially outwardly relative to the stem portion 48, such that the outer end 94 of the tube 74 moves axially inwardly relative to the outer end 62 of the stem 48 and, at the same time, the volume of the air compartment 92 increases drawing air inwardly into the air compartment 92 via the annular outlet 98. An outer portion 108 of the stream 102 is shown falling downwardly under gravity as indicated by the arrow 114, with the outer portion 108 fully separated from the inner portion 106 of the stream 102. A meniscus 104 is again shown as being formed at the outer end of the inner portion 106 of the stream 102 across the stem 48.

Figure 9:
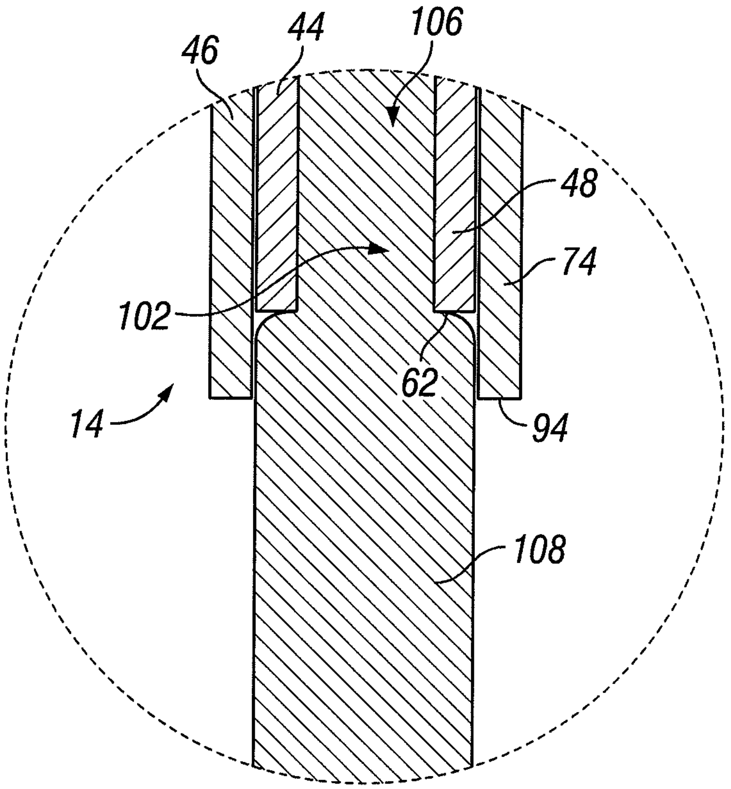
FIG. 9 is an enlarged cross-sectional side view the same as in FIG. 8, however, showing a condition with the pump assembly in a retraction stroke in the partially retracted position as shown in FIG. 3.

In the sequence of operation from the position of FIG. 8 through to the position of FIG. 15, it is to be appreciated that, as seen in FIG. 9, the stream 102 of fluid is formed which extends downwardly from the stem 48 and tube 74 as a continuous stream as will be the case particularly with viscous products such as honey. In FIG. 10, with collapse of the air compartment 92, an allotment of air is ejected into the fluid stream 102 towards initiating separation of an inner portion 106 of the stream 102 from the outer portion 108 of the stream. With increased ejection of air between the inner portion 106 and outer portion 108, the inner portion 106, the air bubble 110 becomes enlarged and tends to extrude the outer portion 108 of the fluid stream 102 outwardly with the outer portion 108 coming to be severed from the inner portion 106 sufficient that the severed outer portion 108 may be discharged to drop downwardly. Rapid sudden violent breaking of the air bubble 110 is believed to assist in breaking connection even in viscoelastic fluids between the inner stream portion 106 and outer stream portion 108.

The particular nature of the formation of the air pocket or bubble 110 is not limited to that shown in the exemplary schematic drawings. Rather than a single air pocket or bubble 110, a plurality of pockets or bubbles may be formed which preferably disseminate radially inwardly from the annular outlet 98 as to coalesce and form at least partially across the horizontal cross-section of the fluid stream at a location where the stream inner portion 106 at least commences to be separated from the outer portion 108 and providing an air pocket or bubble or air pockets or bubbles into which further air to be ejected can further assist in severing the stream inner portion 106 from the stream outer portion 108 and displace the outer portion 108 outwardly. The air bubble or bubbles 110 preferably have a wall 113 thereabout formed from the fluid 11 and having weakened portions radially outwardly over at least some circumferential extent of the fluid stream 102 such that with rupturing of the wall 113 at weakened radial portions, there is an initiation over at least some cross-sectional area of at least partial severance of the stream inner portion 106 from the stream outer portion 108, which at least partial severance can then be of assistance in further spreading across the entire cross-section of the stream 102 leading towards severance. This severance is assisted in part by gravity acting on the stream outer portion 108 axially outward of the stem 48 and tube 74, the relative movements of the stem 48 and the tube 74, the ejection of air, cessation of injection of air and withdrawal of air.

The air bubble 110 in one sense is functionally similar to an air wedge extending radially into the stream 102 and being a location for initiation of separation. The air bubble 110 in another sense in expanding extrudes the stream outer portion 108 away from the stream inner portion 106. The air bubble 110 in another sense provides a joining structure which may be stressed or stretched towards breaking and in stretching reduces the cross-sectional area of the fluid joining the inner portion 106 and the outer portion 108 and presents the fluid joining in a configuration subject to sudden separation.

Figure 16:
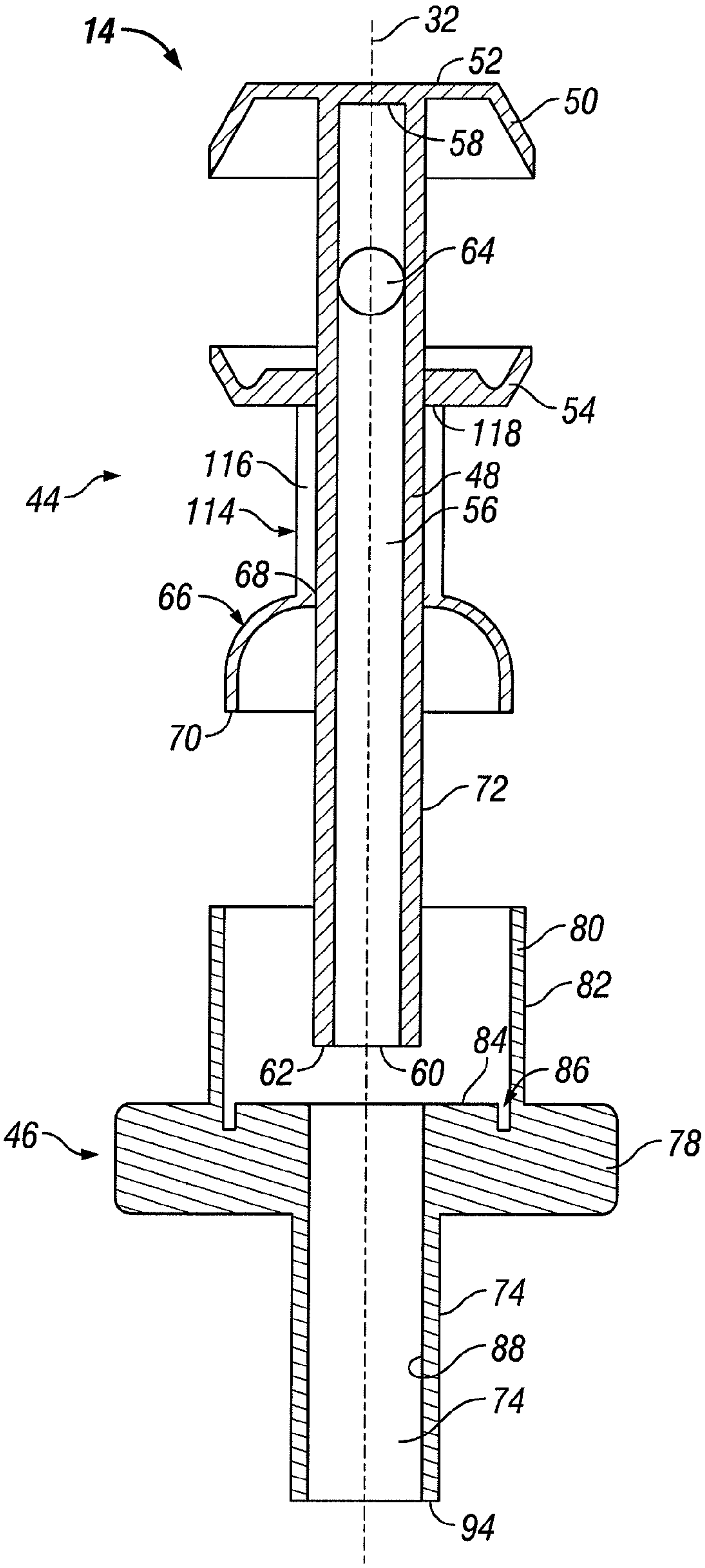
FIG. 16 is an exploded view similar to FIG. 6 but showing an alternate construction for the piston.

Reference is made to FIG. 16 which shows an exploded side view of a first alternate embodiment piston 14 for use in the first embodiment of FIGS. 1 to 15 in substitution of the piston 14 shown in FIG. 6 and which would operate in a manner substantially identical. The piston illustrated in FIG. 6 is formed from two elements. In contrast, the piston 14 of FIG. 16 has three elements, the stem portion 44, a sleeve portion 46 and a separate bellows member 114. In the alternate embodiment of FIG. 16, the bellows member 114 is separately formed to have a bellows disc 66 the same as shown in FIG. 6, however, carried on an axially extending bellows tube 116 which extends axially inwardly from the inner end 68 of the bellows disc 66 with an inner end 118 of the bellows tube 116 to engage the outer disc 54. The bellows tube 116 is provided of sufficient thickness that it does not substantially axially compress. The entirety of the bellows member 114 may be made from elastomeric material so as to provide enhanced elasticity and resiliency to the bell formed by the bellows disc 66 which is desired to suitably resiliently collapse during operation.

Figure 17:
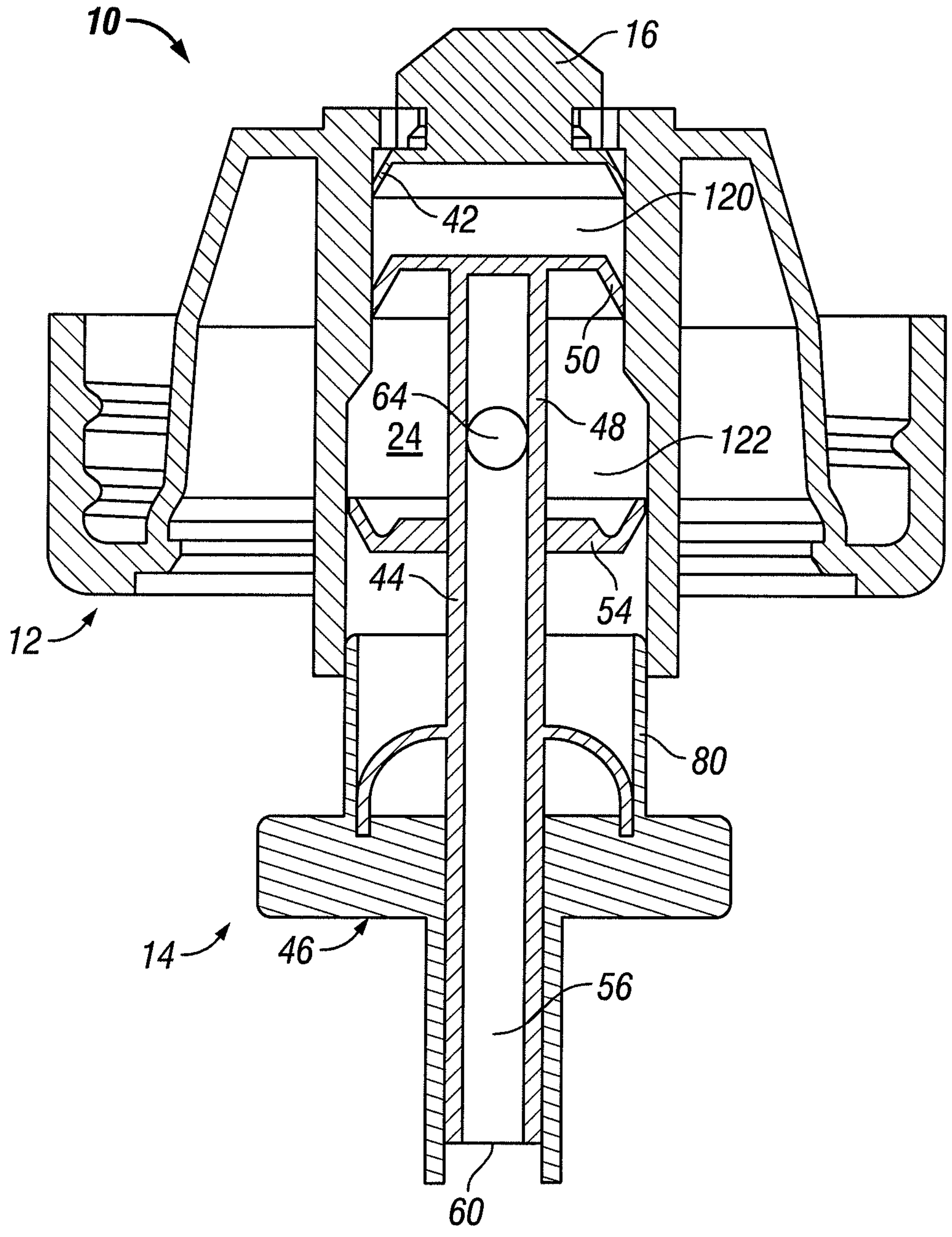
FIG. 17 is a schematic cross-section side view of a pump assembly in accordance with a second embodiment of the present invention in a fully extended position.
Figure 18:
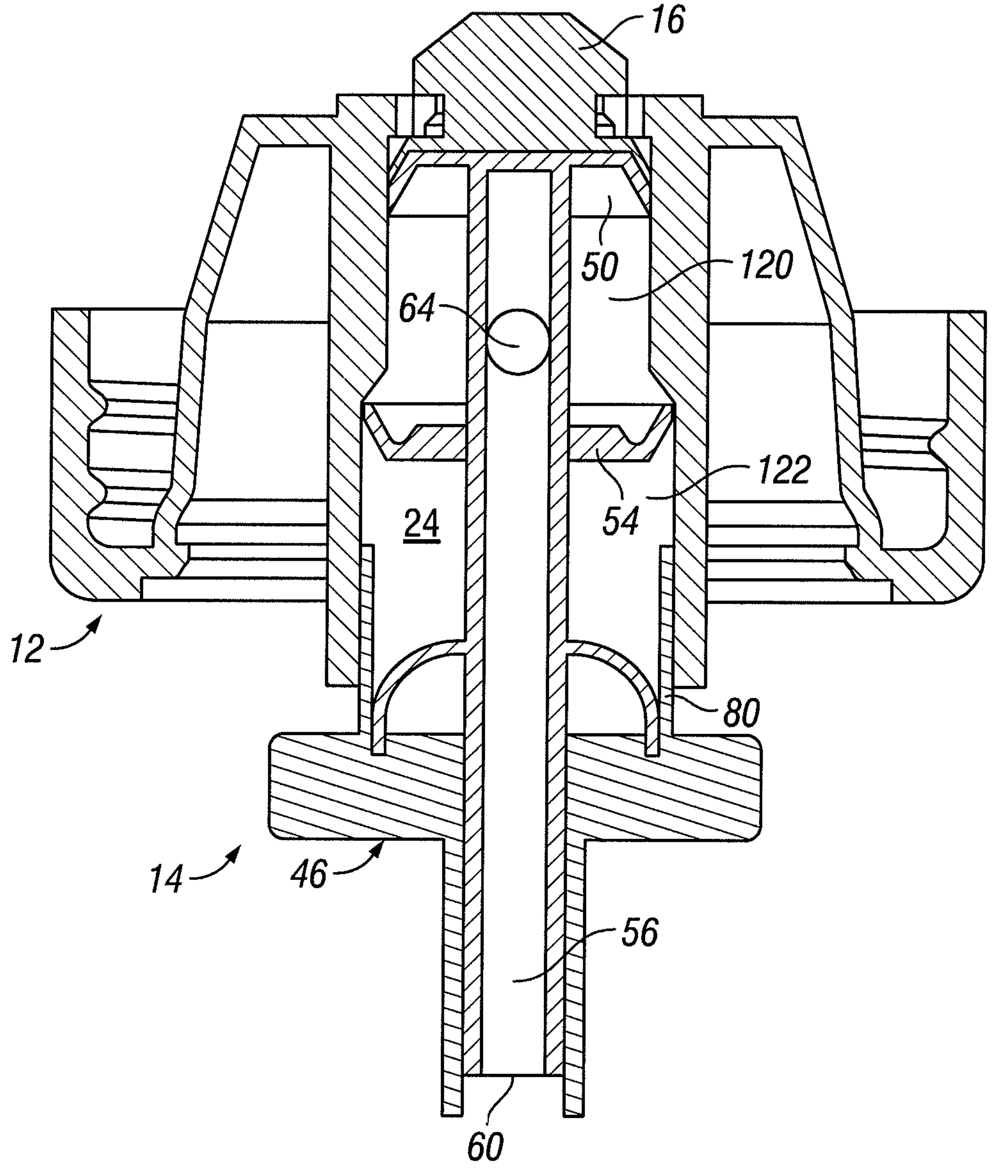
FIG. 18 is a cross-sectional side view of the pump assembly of FIG. 17 in a partially retracted position.
Figure 19:
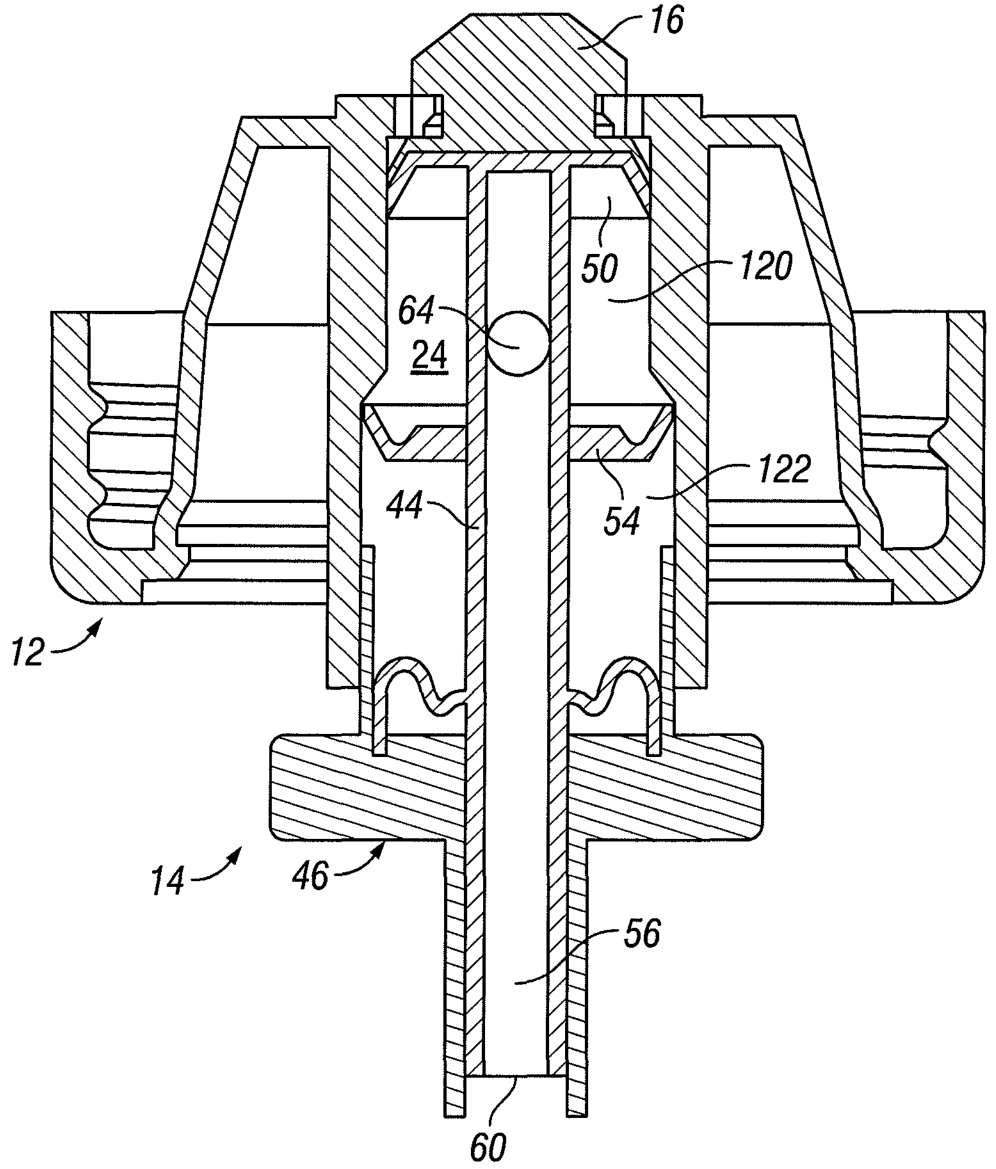
FIG. 19 is a cross-sectional side view of the pump of FIG. 17 in a fully retracted position.

Reference is made to FIGS. 17 to 19 which illustrate a second embodiment of a pump assembly 10 in accordance with the present invention. The second embodiment illustrated in FIGS. 17 to 19 is identical to the embodiment of the first embodiment in FIGS. 2, 3 and 4, respectively, with the exception that whereas the chamber 24 in the first embodiment is of a constant diameter, the chamber 24 in the second embodiment is a stepped chamber having an inner chamber portion 120 of a reduced diameter compared to an outer chamber portion 122, with the inner disc 50 on the stem 48 and the disc 42 of the one-way valve 16 sized to be complementary in diameter to the diameter of the inner chamber portion 120 and with the outer disc 54 and the centering tube 80 being complementary sized to the diameter of the outer chamber portion 122. In the second embodiment of FIGS. 17 to 19, the interaction between the sleeve portion 46 and the stem portion 44 is identical to that in the first embodiment. The second embodiment varies in the manner in which the stem portion 44 operates to draw and discharge fluid. The stem portion 44 in the second embodiment operates to dispense fluid outwardly on movement of the stem portion 44 from the position of FIG. 17 axially inwardly to the position of FIG. 18, in a similar manner to that with the first embodiment. In the second embodiment on the stem portion 44 on moving outwardly in a withdrawal stroke from the position of FIG. 18 to the position of FIG. 17 due to the enlarged diameter of the outer chamber portion 122 compared to the inner chamber portion 120, there is a drawback of fluid from the discharge outlet 60 via the central passageway 56 through the opening 64 into the annular compartment within the chamber 24 between the inner disc 50 and the outer disc 54. That is to say, the volume of such annular compartment increases on outward movement of the piston stem portion 44 from the position of FIG. 18 to the position of FIG. 17. The drawback of fluid stream 102 within the central passageway 56 assists in severing any connection between the stream inner portion 106 and the stream outer portion 108. Thus, after at least partial severing between the stream inner portion 106 and the stream outer portion 108 which may have been initiated by injection of air from the annular outlet 98 into the fluid stream 102 as by breaking of an air bubble, subsequent drawback of the stream inner portion 106 will assist in severing of any reduced or weakened junction between the stream inner portion 106 and the stream outer portion 108.

Figure 20:
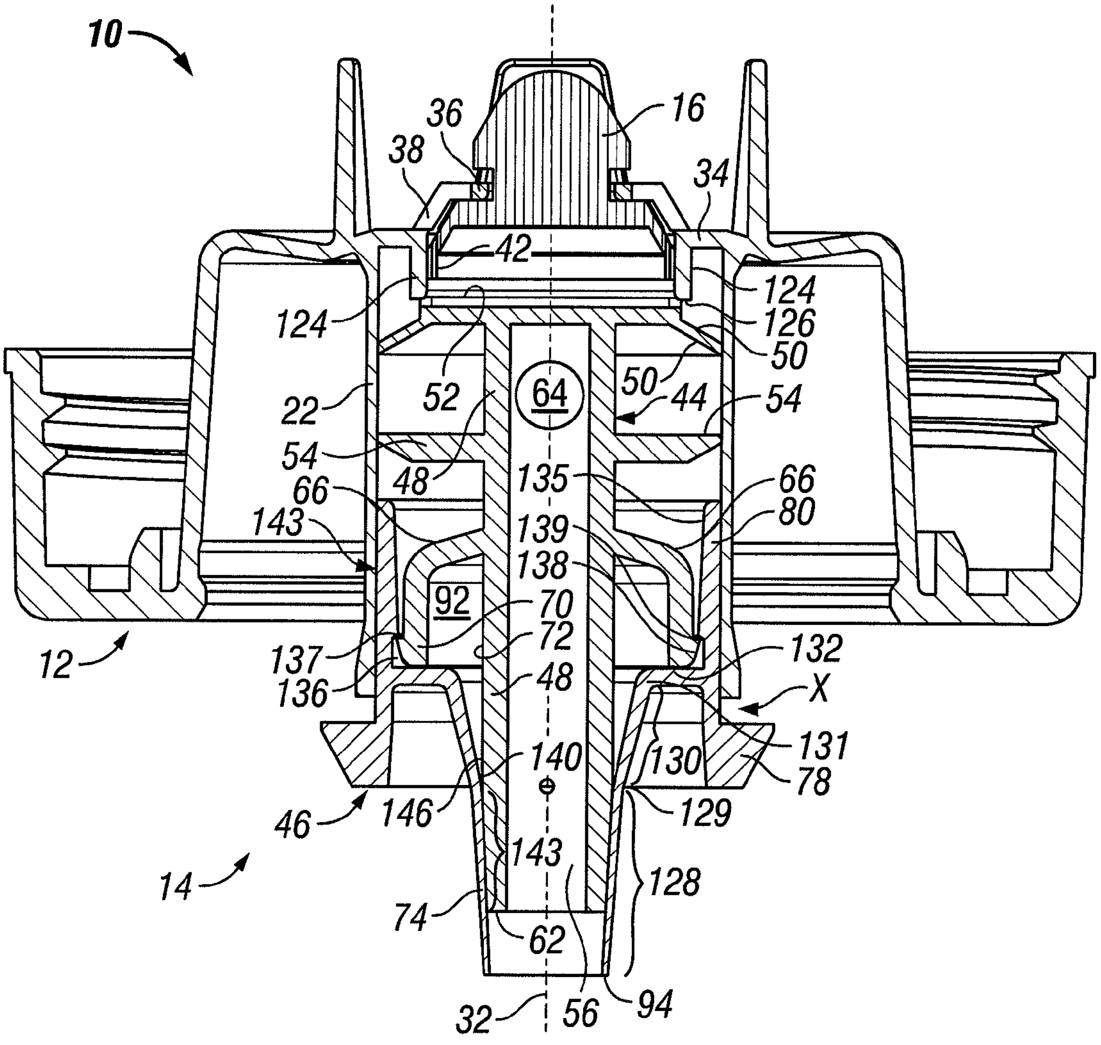
FIG. 20 is a schematic cross-sectional side view of a pump assembly in accordance with a third embodiment of the present invention in a partially retracted position similar to FIG. 3.
Figure 21:
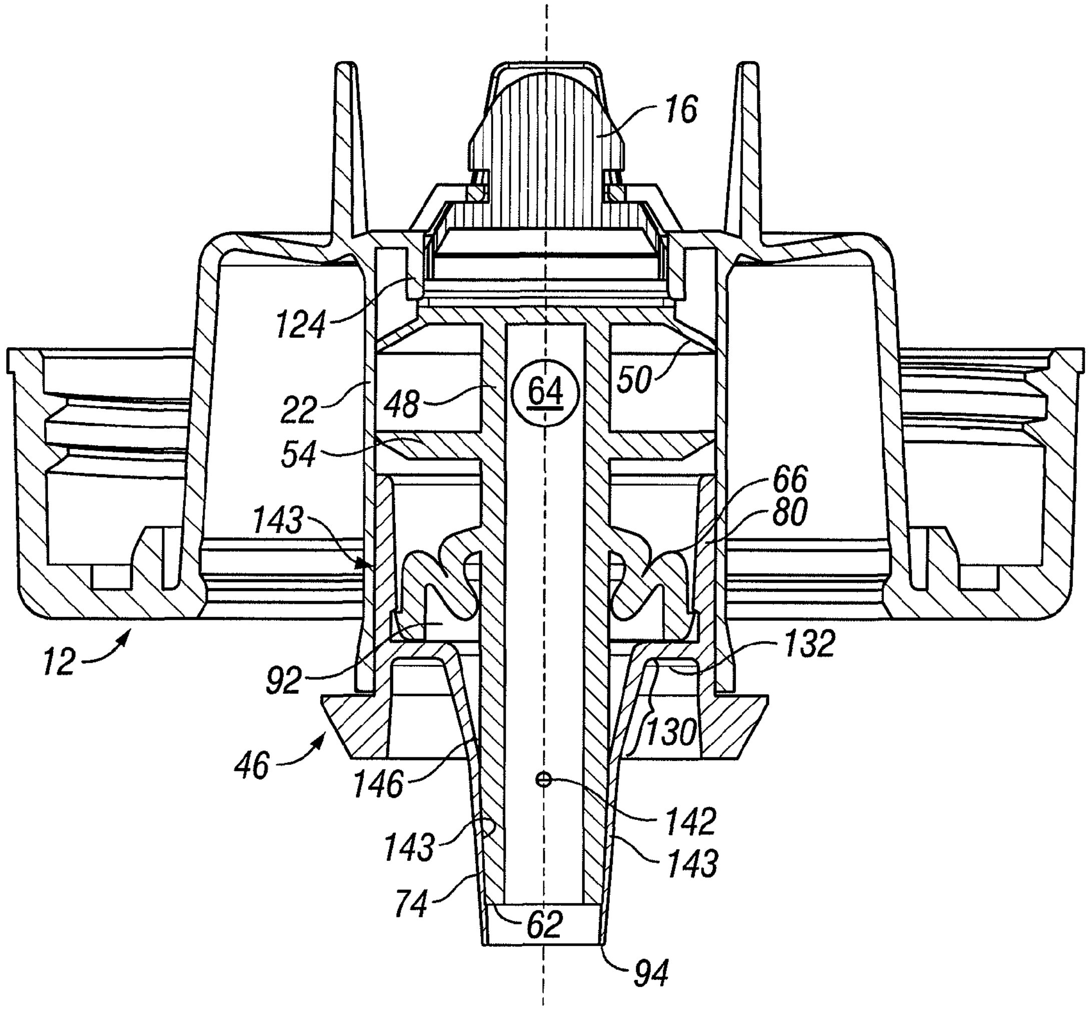
FIG. 21 is a cross-sectional side view of the pump assembly of FIG. 20 in a fully retracted position.

Reference is made to FIGS. 20 and 21 which show a third embodiment of a pump assembly in accordance with the present invention. With all the illustrated embodiments, similar reference numerals are used to represent similar elements. The pump assembly 10 of the third embodiment has considerable similarities to the pump assembly of the first embodiment. One difference is the formation of the end flange 34 of the body 12 at the inner end 28 of the chamber 24. In FIGS. 20 and 21, the end flange 34 includes an axially outwardly extending tubular portion 124 with an axially outwardly directed end stop surface 126 which is adapted to be engaged by the inner end 52 of the stem 48 to stop inward movement of the stem portion 44. Another difference is that the one-way valve 16 has its disc 42 sealed against the inner wall of the tubular portion 124 and a portion of the end flange 34 which carries the opening 36 and the inlet orifices 38 is shown to extend axially inwardly.

In FIGS. 20 and 21, the centering ring 80 extends axially outwardly and carries the engagement flange 78 thereon. The tube 74 increases in diameter as it extends inwardly from its outer end 94 axially inwardly as an outer frustoconical portion 128 merging at 129 into an enlarged inner frustoconical portion 130 which merges at its inner end 131 into a radially outwardly extending annular connecting flange 132 which merges with the centering ring 80 inwardly of the engagement flange 78. The radially inwardly directed annular surface 135 of the centering ring 80 carries a radially outwardly extending slot 136 providing an axially outwardly directed inner shoulder 137.

The outer end 70 of the bellows disc 66 carries an annular radially outwardly extending boss 138 providing an axially inwardly directed shoulder 139. The axially inwardly directed shoulder 139 on the boss 138 of the bellows disc 66 engages within the axially outwardly directed shoulder 137 of the slot 136 of the centering ring 80 to secure the outer end 70 of the bellows disc 66 to the sleeve portion 46 as in the manner of a snap-fit.

The radially outwardly directed surface of the outer wall 72 of the stem 48 has an axially outer tapering portion 143 which is frustoconical increasing in diameter from the outer end 62 inwardly to a circumferential point 140 and with the outer wall 72 being cylindrical axially inwardly therefrom. An air aperture 142 is provided through the wall 72 of the stem 48 open into the outlet passageway 56.

The tube 74 is resilient and the outer frustoconical portion 128 of the tube 74 is sized so as to engage the tapering portion 143 of the stem 48 to provide for selective air flow inwardly and/or outwardly through the air aperture 142. The air compartment 92 is defined between the stem 48, the bellows disc 66 and the tube 74. In the partially extended position shown in FIG. 20, the air aperture 142 is preferably located at a location which permits air flow inwardly through the air aperture 142 into the air compartment 92 and, in this regard, is preferably located inwardly of an inner junction 146 between the tube 74 and the stem 48. In moving from the position of FIG. 20 to the position of FIG. 21 in a retraction stroke, the sleeve portion 46 is slid axially inwardly relative to the stem portion 44 thus moving the tube 74 axially inwardly such that the outer frustoconical portion 128 of the tube 74 overlies the air aperture 142 with the outer frustoconical portion 128 biased onto the tapering portion 143 of the stem 48 to resist flow outward through the air aperture 142. With collapse of the bellows disc 66, the volume of the air compartment 92 reduces and pressures are developed within the air compartment 92 sufficient to deflect the outer frustoconical portion 128 of the resilient tube 74 radially outwardly away from the stem 48 to permit air to be ejected outwardly through the air aperture 142 into the fluid stream within the outlet passageway 56 and, as well, if there is sufficient build up of air pressure to also permit air to be ejected out of the tube 74 annularly about the outer end 62 of the stem 48. Advantageously, in movement from the position of FIG. 20 toward the position of FIG. 21, the closing of the air aperture 142 and the build up of pressure within the air compartment 92 will be such that the air pressure will build up to a relatively high level before being sufficient to deflect the tube 74 radially outwardly but that when this high level is reached, there will result a quick ejection of a volume of air into the fluid stream within the outlet passageway 56 as, for example, out the air aperture 142 and/or out past the outer end 62 of the stem 48.

In the third embodiment of FIGS. 20 and 21, the center tube 22 of the body 12 is shown to have a wall of reduced radial thickness such that the center tube 22 may have an inherent bias which urges it radially into engagement with the inner discs 50 and outer disc 54 on the piston 14 as is advantageous to assist in forming fluid impermeable seals therewith.

The embodiment of FIGS. 20 and 21 may be configured so as to provide air flow into the air compartment 92 via an axially extending air passageway 143 between the center tube 22 and the centering ring 80 to axially inwardly past the axial inner end of the centering ring 80 and then axially downwardly between the outer end 70 of the bellows disc 66 and the annular slot 136 of the centering ring 80. For example, in a retraction stroke, when forces are applied to the sleeve portion 46 moving the sleeve portion 46 axially inwardly relative to the stem portion 44 which axially compress the bellows disc 66, engagement between the outlet end 70 of the bellows disc 66 and the slot 136 can prevent air flow outwardly therepast, however, in a withdrawal stroke when the sleeve portion 46 is moving axially outwardly relative to the stem portion 44, the outer end 70 of the bellows disc 66 may be marginally spaced from the slot 136 to permit air flow therebetween inwardly into the air compartment 92. This may be advantageous, for example, so as to locate the air aperture 142 at a location in which the air aperture 142 will not need to permit air flow through the air aperture 142 into the air compartment 92.

Reference is made to the fourth embodiment of the pump assembly 10 illustrated in FIGS. 22 to 27. The fourth embodiment of FIGS. 22 to 27 is identical to the third embodiment of FIGS. 20 and 21 with two exceptions. A first exception is that the slot 136 in the fourth embodiment of FIGS. 22 to 27 is of increased axial dimension compared to the slot 136 in the third embodiment of FIGS. 21 and 22. In the fourth embodiment of FIGS. 22 to 25, the slot 136 has an axial extent greater than the axial extent of the boss 138 carried on the bellows disc 66 so that the boss 138 can slide axially relative to the slot 136 as between: a position in which in a retraction stroke the outer end of the boss 138 engages with the connecting flange 132 of the tube 74 as to transfer forces from the sleeve portion 46 onto the stem portion 44 to urge the stem portion 44 axially inwardly, and, a position in which in a withdrawal stroke, the axially inwardly directed shoulder 139 on the boss 138 engages the axially outwardly directed shoulder 137 of the slot 136 such that movement of the sleeve portion 46 outwardly draws the stem portion 44 outwardly therewith. The provision of the slot 136 to be axially elongate for relative axial movement of the boss 138 therein provides for a drawback of fluid from the outlet 60 via the outlet passageway 56 during a portion of the withdrawal stroke represented by movement between the position of FIG. 24 and the position of FIG. 25.

Figure 22:
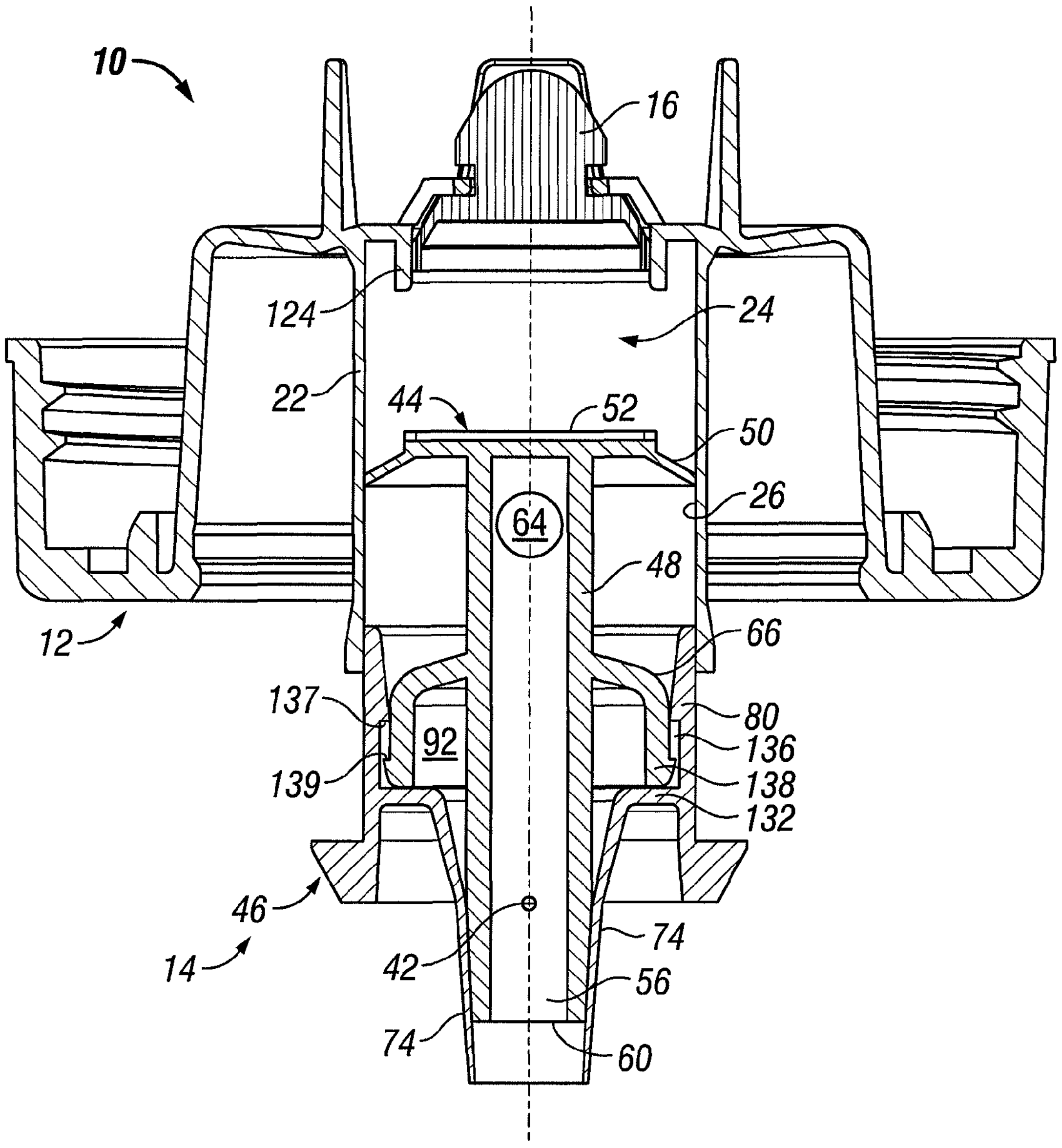
FIG. 22 is a schematic cross-sectional side view of a pump assembly in accordance with a fourth embodiment of the present invention in a fully extended position at the commencement of a retraction stroke.

A second exception between the third embodiment of FIGS. 20 and 21 and the fourth embodiment of FIGS. 22 to 27 is that the outer disc 54 has been eliminated from the fourth embodiment of FIGS. 22 to 25. Whereas in the third embodiment of FIGS. 20 to 21, the outer disc 54 provides a seal to prevent flow of fluid outwardly therepast, in the fourth embodiment as seen in FIG. 22, the centering ring 80 engages the chamber wall 26 so as to provide a seal therebetween which prevents fluid flow inwardly or outwardly therebetween. In the fourth embodiment, in movement from the fully retracted position of FIG. 24 to the partially extended position of FIG. 25, the volume of the annular compartment between the inner disc 50 at the upper end and, the centering ring 80 and the bellows disc 66, at the lower end, increases such that there is drawback of fluid from the outlet passageway 56 through the inlet opening 64. As well, in this movement from the position of FIG. 24 to the position of FIG. 25, there is a drawing of air into the air compartment 92 with the return of the bellows disc 66 from the collapsed condition of FIG. 24 to the uncollapsed condition of FIG. 25. The substantially simultaneous drawback of fluid and drawback of air is believed to be advantageous towards assisting in severing the fluid stream into a stream inner portion and a stream outer portion at a location where air had earlier in the stroke been injected into the fluid stream, or at least completing any such severing.

Figure 23:
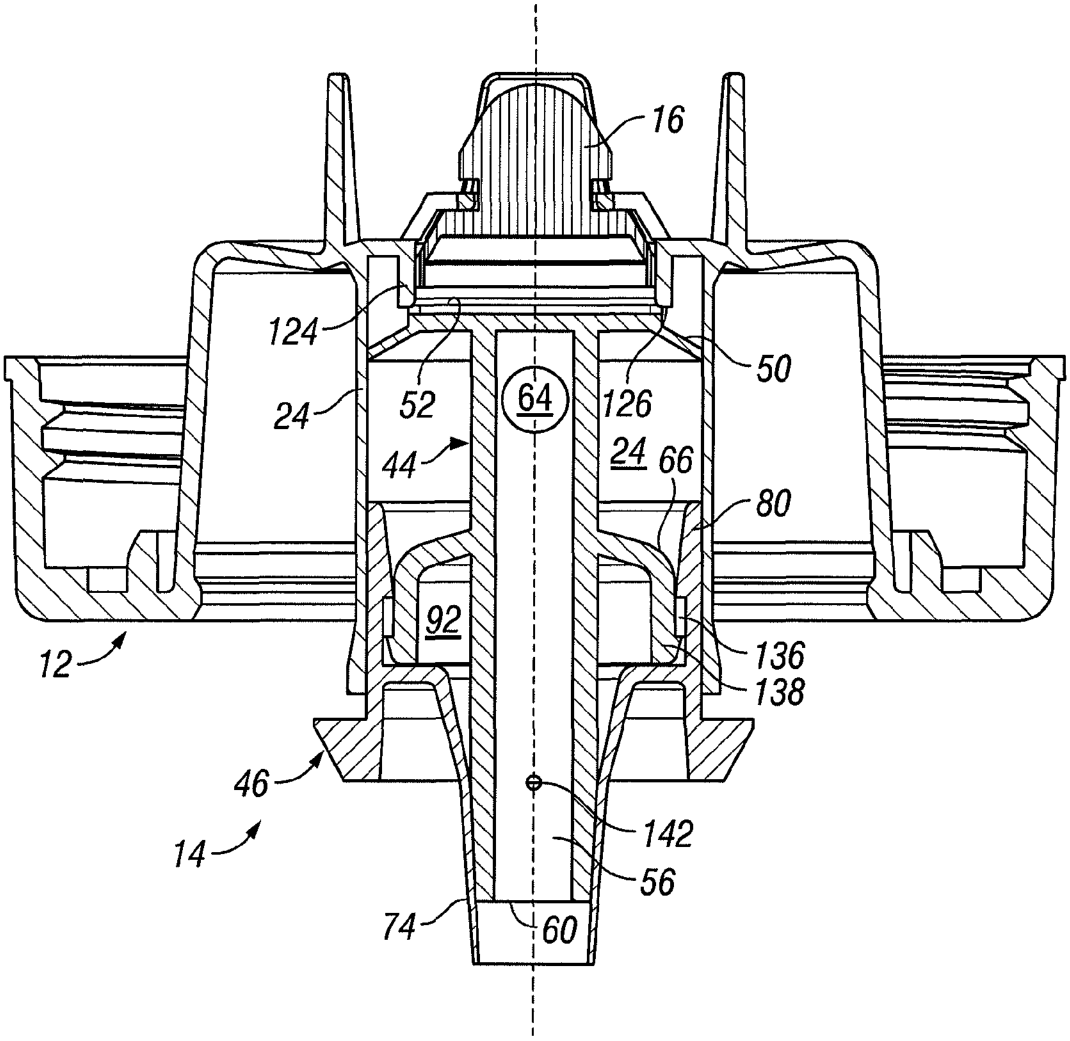
FIG. 23 is a cross-sectional side view of the pump of FIG. 22 in a partially retracted position in a retraction stroke.

In operation of pump assembly 10 in accordance with the fourth embodiment of FIGS. 22 to 27, in a retraction stroke from the fully extended position shown in FIG. 22, movement of the sleeve portion 46 axially inwardly moves the stem portion 44 axially inwardly in unison from the position of FIG. 22 to the partially retracted position of FIG. 23 whereupon further inward movement of the stem portion 44 is prevented by engagement of the inner end 52 of the stem 48 with the end stop surface 126 of the body 12. In movement from the position of FIG. 22 to the position of FIG. 23, fluid in the chamber 24 between the inner disc 50 and the one-way valve 16 is compressed to pass outwardly past the inner disc 50 and hence via the inlet opening 64 into the outlet passageway 56 and out the discharge outlet 60.

Figure 24:
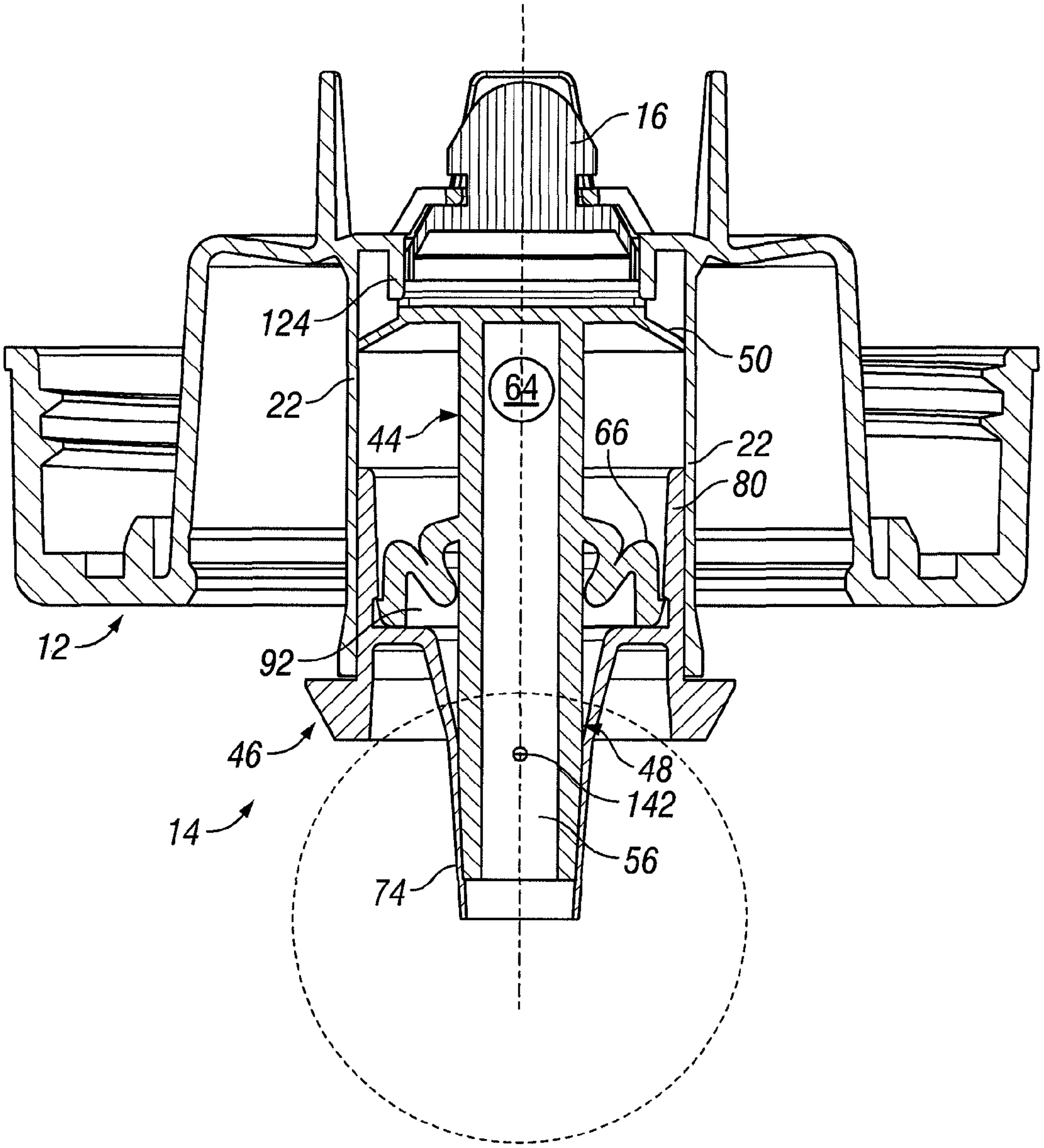
FIG. 24 is a cross-sectional view of the pump assembly of FIG. 22 in a fully retracted position.
Figure 25:
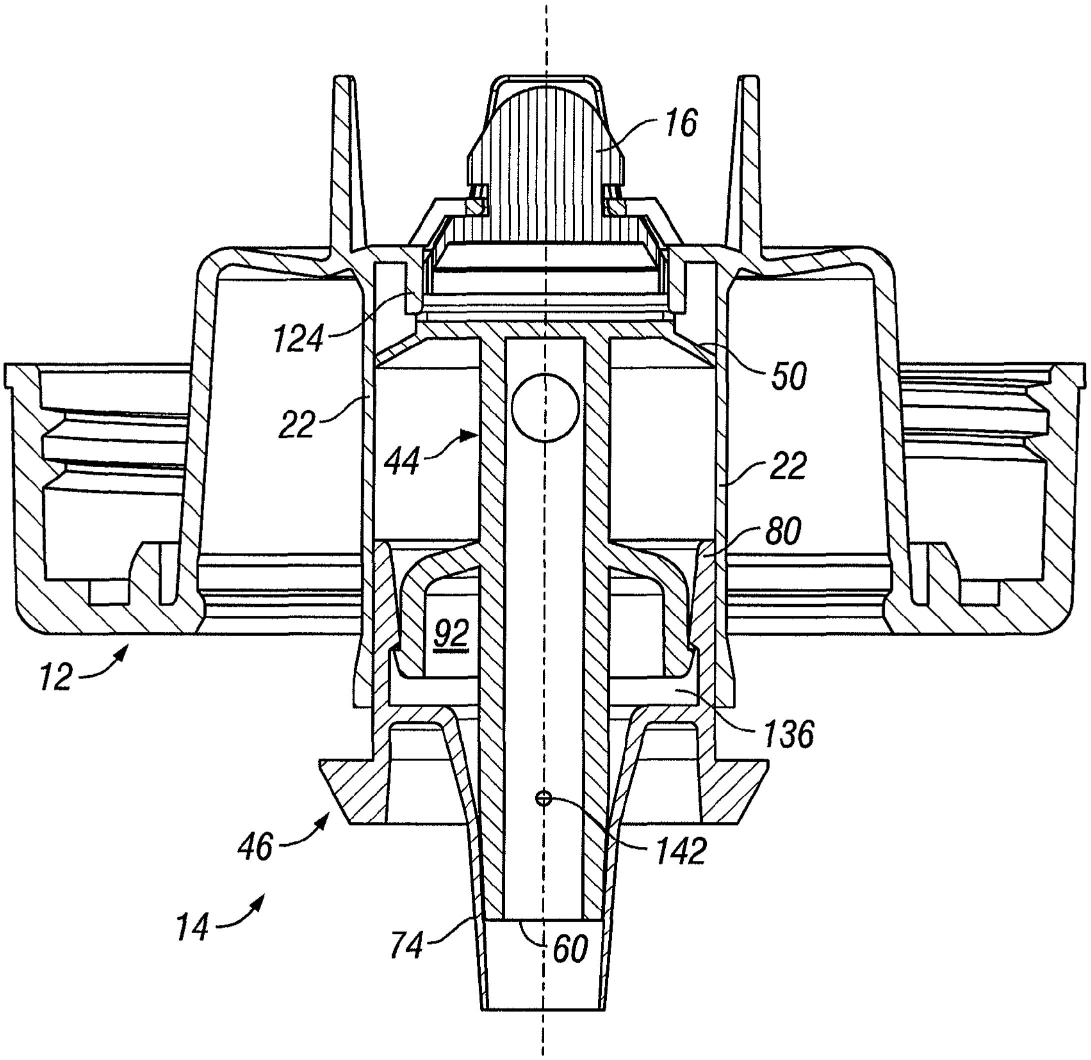
FIG. 25 is a cross-sectional side view of the pump of FIG. 22 in a partially retracted position in a withdrawal stroke.

In movement from the position of FIG. 23 to the position of FIG. 24, the volume of the annular compartment between the inner disc 50 and the centering ring 80 and the bellows disc 66 is, to a minor extent, reduced resulting in a further discharge of fluid out the outlet opening 64 into the outlet passageway 56 and out the discharge outlet 60. Simultaneously, during the movement between the position of FIG. 23 and the fully retracted position of FIG. 24, the bellows disc 66 is collapsed reducing the volume of the air compartment 92 and discharging air therefrom through the tube 74 and out the air aperture 142 into the fluid stream. Subsequently, in movement from the fully retracted position of FIG. 24 in a withdrawal stroke to the partially retracted position of FIG. 25, fluid is drawn back from the discharge passageway 56 simultaneously with drawing of air via the air aperture 142 back into the air compartment 92.

Figure 26:
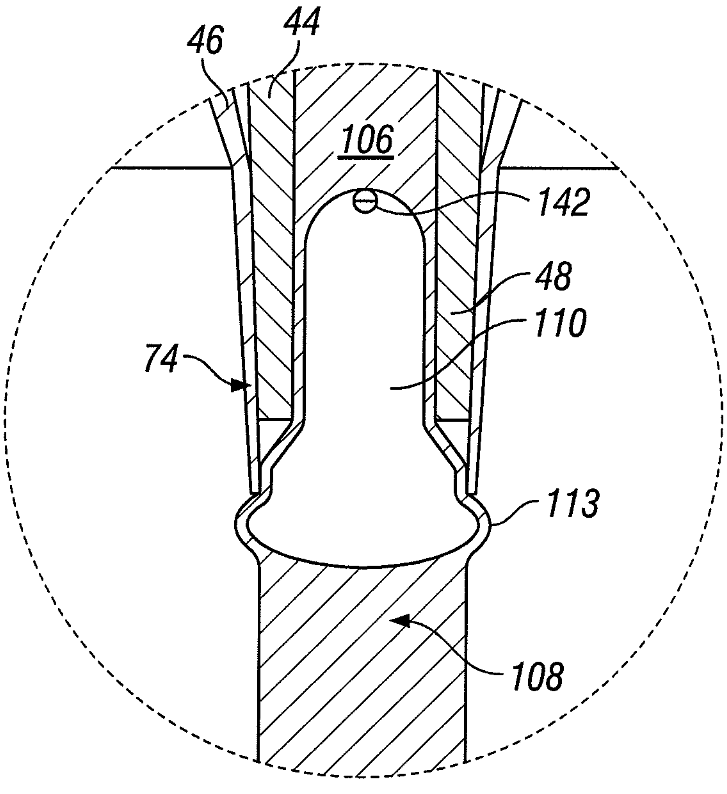
FIG. 26 is an enlarged cross-sectional side view of the pump assembly of FIG. 22 within the broken line circle indicated in FIG. 24 additionally showing fluid being dispensed in a condition with the pump assembly in a retraction stroke in the fully retracted position of FIG. 24.
Figure 27:
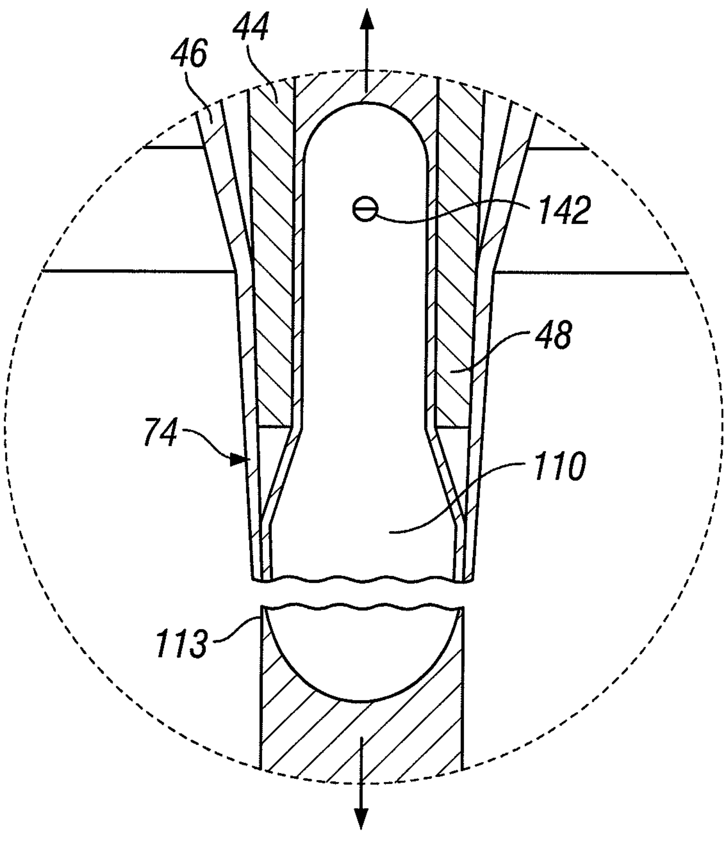
FIG. 27 is an enlarged cross-sectional side view the same as in FIG. 26, however, showing a condition with the pump assembly in a withdrawal stroke in the partially retracted position as in FIG. 25.

In operation of the fourth embodiment, FIG. 26 schematically shows a possible condition of the fluid stream in a retraction stroke on reaching a position close to the fully extended position of FIG. 24. In FIG. 26, an allotment of air has been injected into the fluid stream 102 from the air aperture 142 forming a bubble 110 separating the fluid stream into a stream inner portion 106 and a stream outer portion 108. The bubble 110 extends outwardly from the outer end of the tube 74 and may eminently break at its side wall 113 with further ejection of air. FIG. 27 schematically illustrates a possible condition of the fluid stream in a withdrawal stroke on reaching the position of FIG. 25. From the position of FIG. 24, on movement to the position of FIG. 25, the stream inner portion 106 has been partially drawn back into passageway 56 and air from the bubble 110 or the space where the bubble 110 was in FIG. 24 has been drawn back via the air aperture 142 into the air chamber 92. Axially inward withdrawal of the stream inner portion 106 in opposition to the downward movement of the stream outer portion 108 and the tendency of the stream outer portion 108 to drop down under gravity assists in severing or finalizing the severing of the fluid stream at the location where the air bubble wall 113 is or was with the forces tending to draw the stream inner portion 106 upwardly and the stream outer portion 108 downwardly drawing the stream inner portion 106 apart from the stream outer portion 108 stressing the bubble 110 towards bursting the bubble if not yet burst or severing any string-like remnants of wall 113 of a burst bubble. In the fourth embodiment of FIGS. 22 to 27, in a cycle of operation in a withdrawal stroke, the piston 14 will be moved from the position of FIG. 25 to a fully extended position and then, in a subsequent retraction stroke, the first inward movement of the sleeve portion 46 will move the sleeve portion 46 relative the stem portion 48 to the position shown in FIG. 22. Preferably, in the fourth embodiment, the bubble 110 which is created extends outwardly so as to be proximate the discharge outlet 60 of the stem 48 preferably axially outwardly at least as far as the discharge outlet 60 of the stem 48 and, more preferably, axially to or past the outlet end 94 of the tube 74 as shown in FIG. 24. Subsequently, with withdrawal back of both the stream inner portion 106 and air, there is an increased tendency of the wall 113 of the bubble 110 if intact to burst completely or if the bubble has already burst to break to fully sever the stream inner portion 106 from the stream outer portion 108. Bursting of the bubble and severing of remnants of the wall of a burst bubble is enhanced both by gravity acting on the stream outer portion 108 and by the momentum of the stream outer portion 108 moving at a velocity downwardly immediately prior to drawback of the stream inner portion 106 and air.

In each of the third, fourth and fifth embodiments, the air aperture 142 is shown through the stem 48 and, preferably, all the air which is injected into the fluid stream 102 may be injected via this air aperture 142 as by the tube 74 being displaced radially outwardly of the stem to permit fluid flow through the air aperture 142, as in the manner of a known bicycle valve. However, the air aperture 142 is not necessary. The resilient engagement of the tube 74 on the stem 48 may be such that when sufficient pressure is developed in the air compartment 92 that the tube 74 is deflected radially outwardly about the stem 48 so as to displace air outwardly at the junction of the tube 74 and the outer end 62 of the stem 48. Further, even if the air aperture 142 is provided, discharge of pressurized air at the juncture of the tube 74 and the outer end 62 of the stem portion 44 may occur in any event if the air aperture 142 is not able to adequately permit flow of the volume of air from the air compartment 92 which is to be promptly discharged from the air compartment 92. The air aperture 142 could thus serve as the primary opening through which air is drawn into the air compartment yet be a lesser opening for discharge of rejected air outwardly from the air compartment. The relative location of the air aperture 142 axially on the stem 48 together with the relative resiliency of the tube 74 and its inner frustoconical portion 130 and outer frustoconical portion 128 can determine the extent to which the air aperture 142 serves both for discharge and drawback of air.

Figure 28:
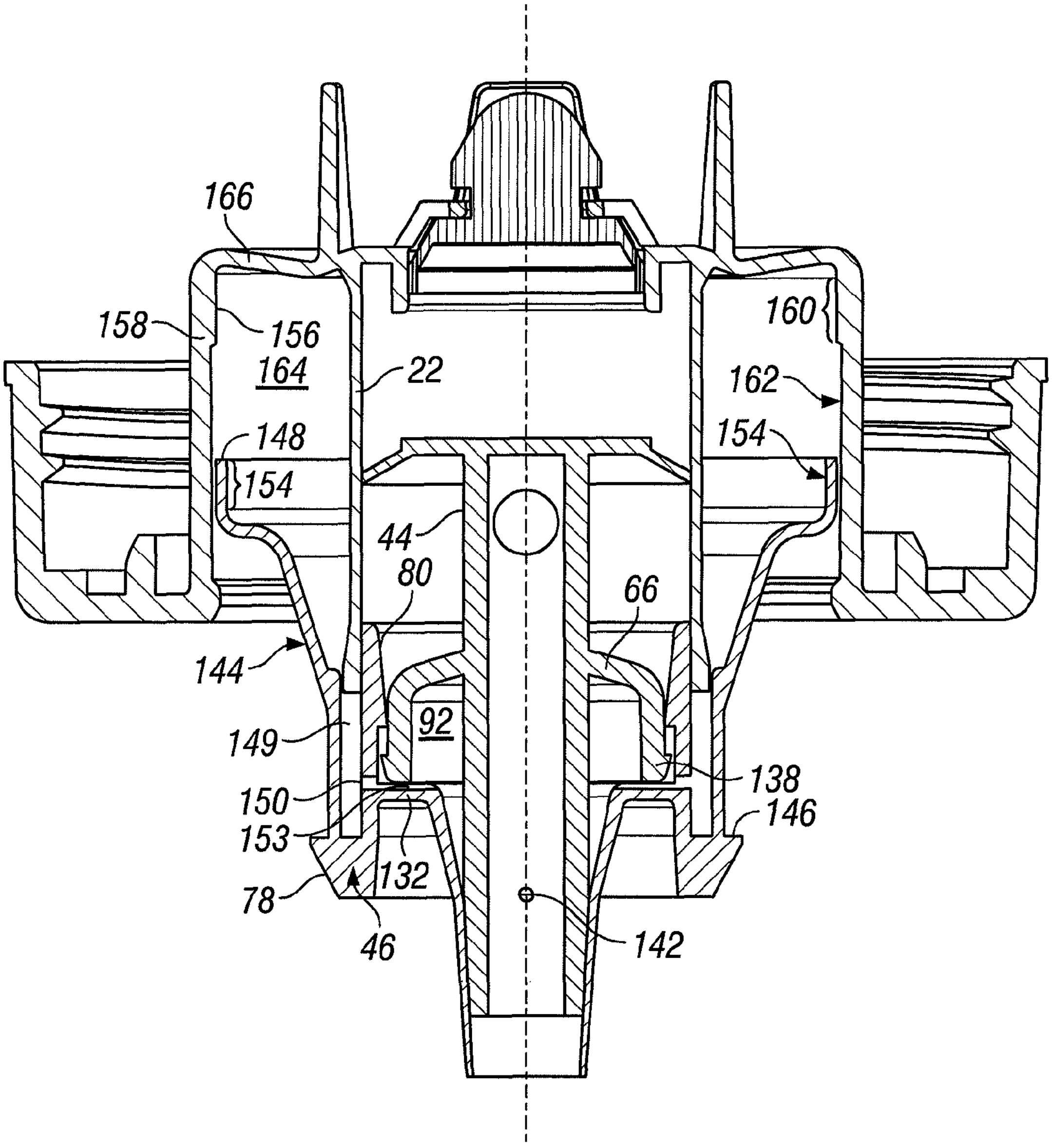
FIG. 28 is a schematic cross-sectional side view of a pump assembly in accordance with a fifth embodiment of the present invention in a fully retracted position at the commencement of the retraction stroke.
Figure 29:
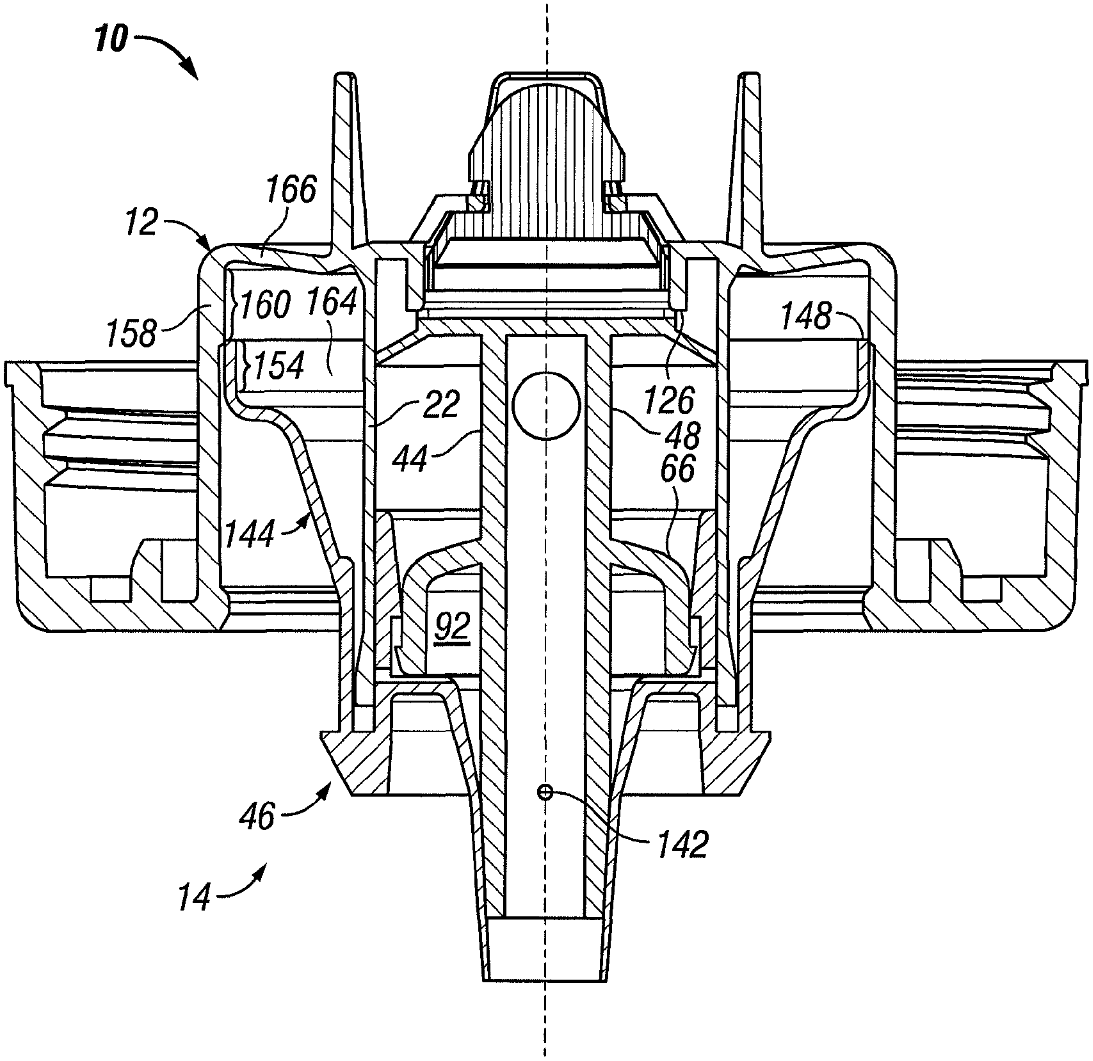
FIG. 29 is a cross-sectional side view of the pump assembly of FIG. 28 in a partially retracted position in a retraction stroke.
Figure 30:
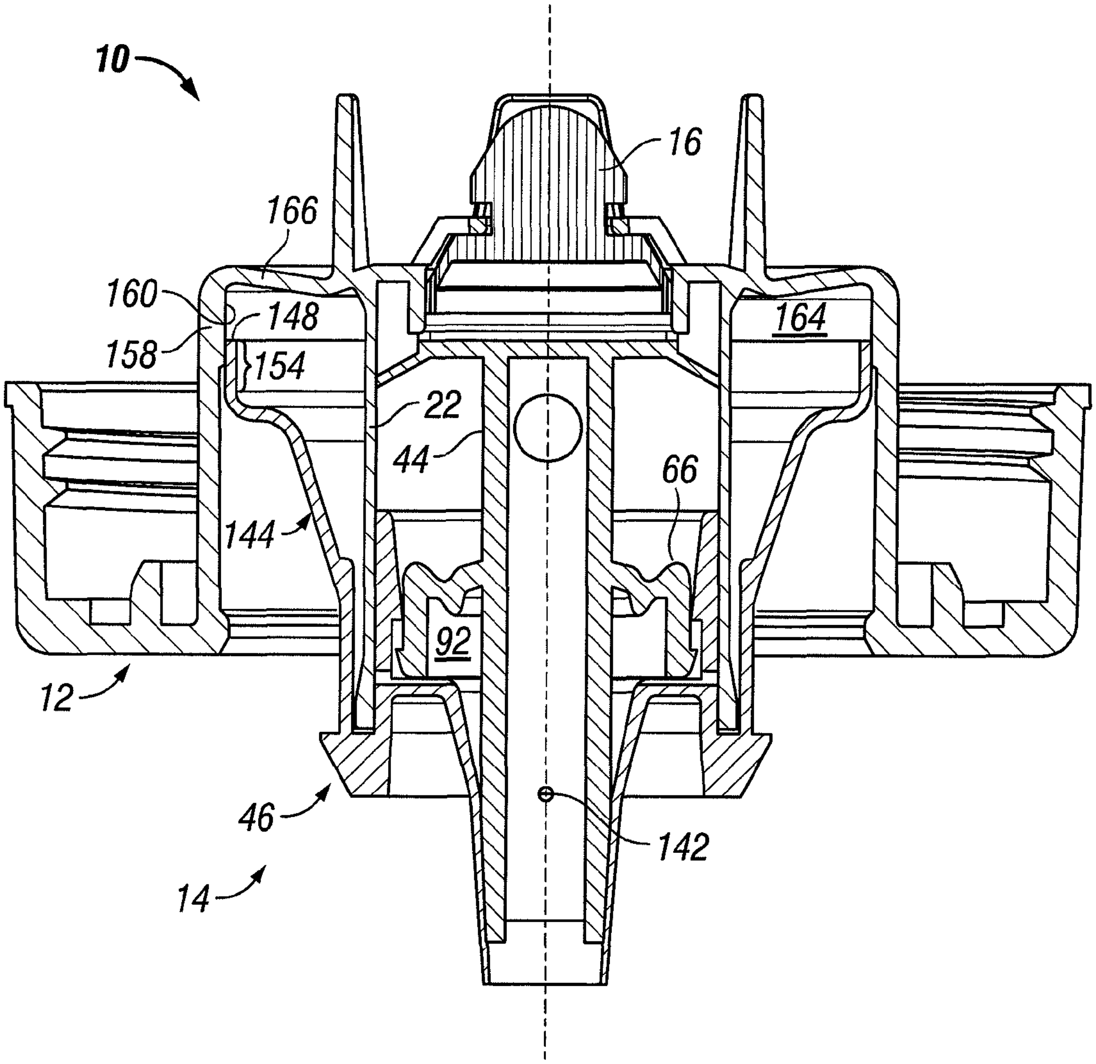
FIG. 30 is a cross-sectional side view of the pump assembly of FIG. 29 in a fully retracted position.
Figure 31:
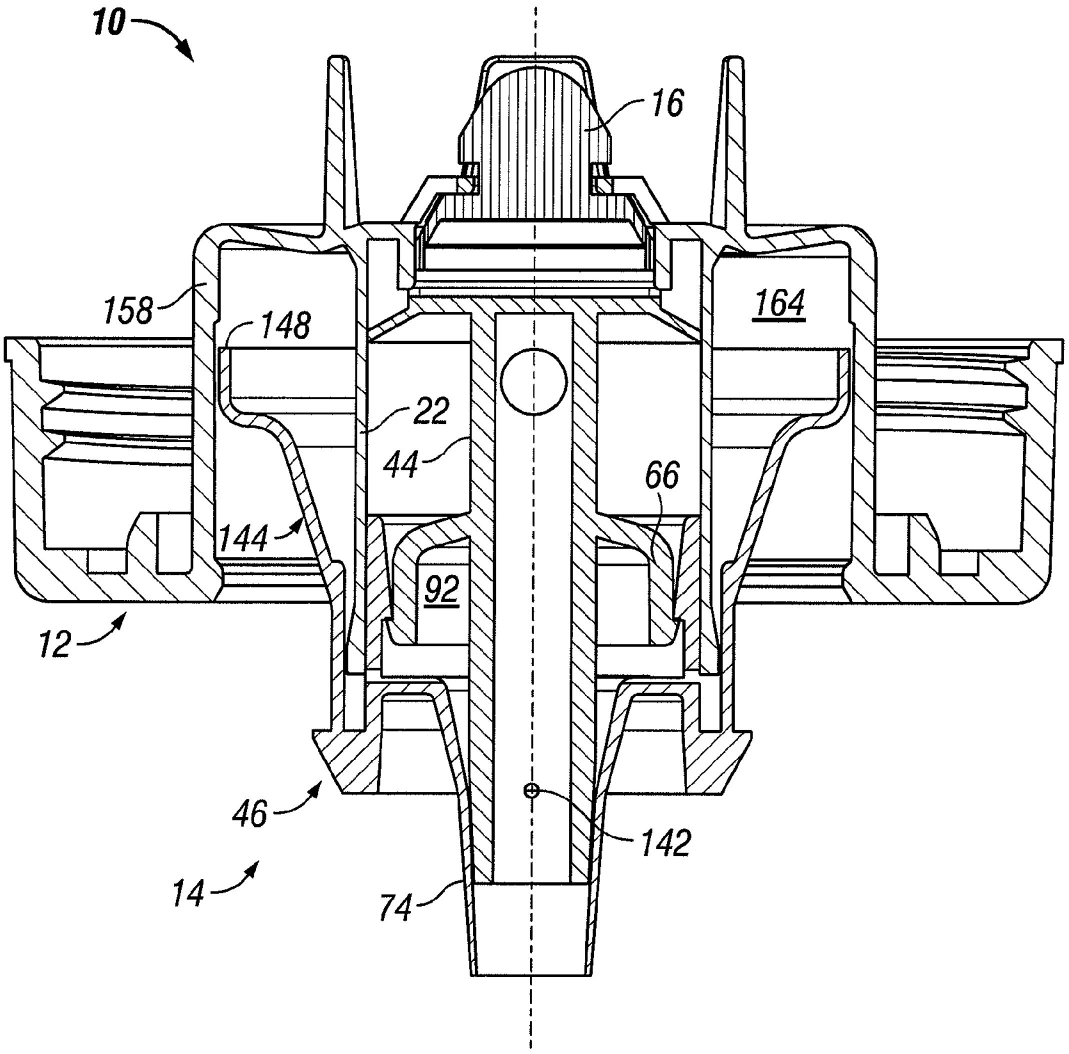
FIG. 31 is a cross-sectional side view of the pump assembly of FIG. 29 in a partially retracted position in a withdrawal stroke.

Reference is now made to FIGS. 28 to 31 which show a fifth embodiment of a pump assembly in accordance with the present invention. The fifth embodiment of FIGS. 28 to 30 is substantially the same as the fourth embodiment of FIGS. 23 to 27, however, additionally provides a secondary air chamber 164 to increase the volume of air injected into the fluid stream. In this regard, the sleeve portion 46 includes an air piston disc 144 which extends axially inwardly from the engagement flange 78. The air piston disc 144 is secured to the engagement flange 78 at an outer end 146 and extending inwardly to an inner end 148. An axially inwardly opening annular space 149 is defined axially inwardly of the engagement flange 78 between the centering ring 80 and the air piston disc 144 sized to axially slidably receive the center tube 22 therein and permit passage of air therepast inwardly and outwardly between the centering ring 80 and the air piston disc 144. A number of air passages 150 are provided radially through the centering ring 80 proximate the connecting flange 132 for free passage of air from the annular slot 149 into the air compartment 92 assisted by each annular slot 149 including a channelway portion 153 which extends radially through the connecting flange 132 such that engagement between the connecting flange 132 and the boss 138 on the bellows disc 66 does not prevent air passage inwardly or outwardly.

At the inner end 148, the air piston disc 144 carries a resilient inner end portion 154 adapted for selective engagement with the radially inwardly directed surface 156 of an outer tube 158 of the body 12. In this regard, the inwardly directed surface of the outer tube 158 is stepped in having an inner portion 160 of a diameter sized for engagement with the end portion 154 of the air piston disc so as to form a seal therewith and an outer portion 162 of a diameter which is larger than the diameter of the inner portion 160 such that air flow is permitted inwardly and outwardly between the end portion 154 of the air piston disc 144 and the outer portion 162. As seen in FIG. 28, the body 12 includes an annular connecting flange 166 which connects the center tube 22 to the outer tube 158. As best seen in FIG. 29, an annular outer air compartment 164 is formed between the body 12 and the air piston disc 144 in the annular space between the center tube 22 and the outer tube 158 axially outwardly of the connecting flange 166. When, as in FIG. 28, end portion 154 of the air piston disc 144 is axially outwardly of the inner portion 160 of the outer tube 158, then air is free to move inwardly and outwardly past the inner end portion 154 of the air piston disc 144 and movement of the sleeve portion 46 does not pressurize or create a vacuum in the outer air compartment 164. When the end portion 154 of the air piston disc 144 is engaged with the inner portion 160 of the outer tube 158, then engagement therebetween forms a seal which prevents fluid flow inwardly or outwardly therepast. In moving from a fully extended position shown in FIG. 28 inwardly in a retraction stroke, there is no substantial compression of air within the outer air compartment 164 until the inner end 148 of the air piston disc 144 engages the inner portion 160 of the outer tube 158 which, in this particular embodiment, substantially occurs at the partially retracted position shown in FIG. 29 at the same time that, in a retraction stroke, the inner stem 48 engages the end stop surface 126 of the body 12. On further axially inward movement from the position of FIG. 29 to the fully retracted position of FIG. 30, air within the outer air compartment 164 is compressed and directed into the inner air compartment 92. The outer air compartment 164 substantially increases the volume of air which is injected into the stream of fluid. In a withdrawal stroke on moving outwardly from the fully retracted position of FIG. 30 to the partially retracted position of FIG. 31, the volume of the outer air compartment 164 will increase until the inner end 148 of the air piston disc 144 extends axially outwardly past the inner portion 160 of the outer tube 158 and thus will attempt to drawback air from the inner air compartment 92 in a first segment of the withdrawal stroke. While the fifth embodiment of FIGS. 28 to 31 shows the inner end 148 of the air piston disc 144 engaging the inner portion 160 of the outer tube 158 at a time when the stem portion 44 engages the end stop surface 126 of the body 12, it is to be appreciated that the inner portion 160 of the outer tube 158 could be adjusted as to its relative axial location so as to become engaged with the inner end 148 of the air piston disc 144 either before or after the inner end 52 of stem portion 44 engages the end stop surface 126 as, for example, to increase on one hand and, on the other hand, decrease the volume of air which is ejected by the outer air compartment 164.

In the context of the fifth embodiment of FIGS. 28 to 31, there is an inner air compartment 92 and an outer air compartment 164. The inner air compartment 92 could be provided such that its volume substantially does not change during operation of the pump and all of the air to be injected arises due to the change in volume of the outer air compartment 164. For example, in this regard, the bellows disc 66 may primarily serve a function of a lost motion mechanism which permits axial movement of the sleeve portion 46 relative to the stem portion 44 as from the partially retracted position shown in FIG. 29 to the fully retracted position in FIG. 30. The bellows disc 66 also preferably serves a function of a spring biasing the stem portion 44 away from the sleeve portion 46 and with the bias of such a spring needing to be overcome in order for the sleeve portion 46 to move axially inwardly relative to the stem portion 44. It is to be understood that in the operation of each of the preferred embodiments discussed, that the axially directed forces required to move the stem portion 44 axially inwardly from a fully extended position to the partially retracted position is to be less than the axially directed forces required to be applied across the bellows disc 66 to collapse the same. The resistance of the bellows disc 66 to collapsing thus is selected to be a sufficient having regard to the nature of the pump mechanism and the fluid to be dispensed that there is appropriate sequencing such that in the retraction stroke, the sleeve portion 46 does not substantially move axially inwardly relative to the stem portion 44 until the stem portion 44 is stopped from axially inward motion by the body 12.

The bellows disc 66 thus provides, on one hand, a suitable loss motion linkage between the sleeve portion 46 and the stem portion 44. The bellows disc 66, on the other hand, provides a spring of sufficient resistance to provide for proper sequencing of the relative inward movement of the sleeve portion 46 and the stem portion 44. The bellows disc 66, on a further hand, in the preferred embodiment illustrated provides the additional feature of, in collapsing, reducing the volume of the inner air compartment 92. Insofar as there is another mechanism to supply pressurized air such as the outer air chamber 164, then the bellows disc 66 need not provide the function of decreasing the volume of the air compartment 92. The spring feature provided by the bellows disc 66 may be accomplished by providing a separate spring element disposed between the sleeve portion 46 and the stem portion 44 biasing the sleeve portion 46 axially outwardly relative to the stem portion 44 with sufficient force.

Figure 32:
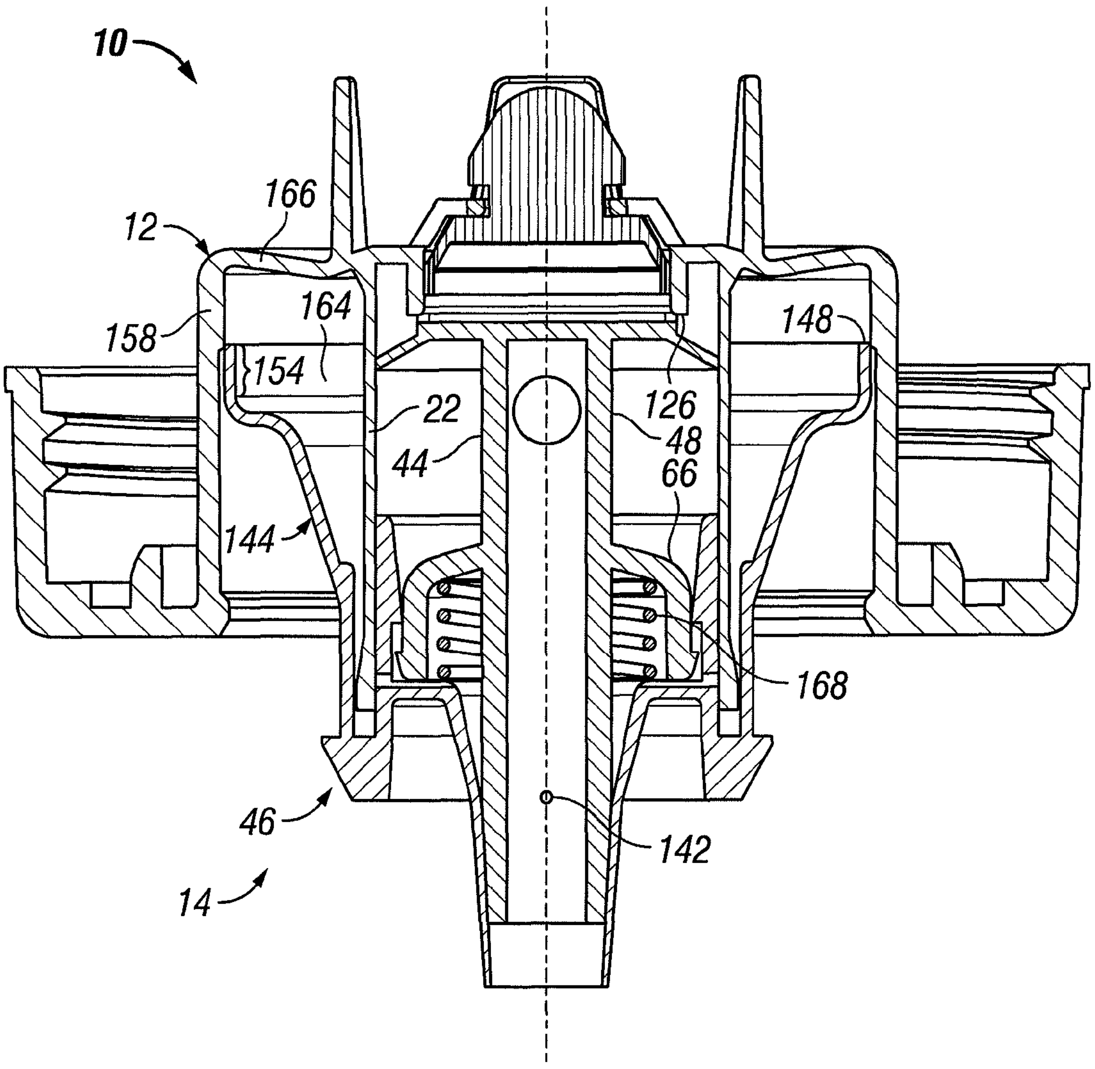
FIG. 32 is a schematic cross-sectional side view of a pump assembly in accordance with a sixth embodiment of the present invention in a fully retracted position at the commencement of the retraction stroke.

Reference is made to a sixth embodiment of a pump assembly 10 in accordance with the present invention as illustrated in FIG. 32. In FIG. 32, the bellows disc of the fifth embodiment of FIGS. 29 to 30 is replaced by a relatively rigid disc 66 and a helical metal coil spring 168 is provided to bias the sleeve portion 46 axially outwardly relative to the stem portion 44. FIG. 32 shows a partially retracted position the same as FIG. 29 in which the stem portion 44 is prevented from further inward movement by the body 12. Further inward movement of the sleeve portion 46 results in compression of the spring 168 and sliding of the boss 138 axially inwardly within the slot 136 such that there is reduction of volume of the outer air compartment 164 so as to inject air into the passageway 56 and, at the same, time a reduction of volume of the annular compartment between the inner disc 50 and the disc 66 which results in a discharge of fluid into the passageway 56. This discharge of fluid can be minimized by minimizing the wall thickness of the centering ring. In the embodiment of FIG. 32, there is no drawback of fluid from the passageway 56 in a withdrawal stroke on the piston moving axially outwardly from the partially retracted position shown in FIG. 32. However, drawback of liquid could be accommodated in an arrangement such as FIG. 32 by other means such as through use of a stepped cylinder arrangement as shown with the second embodiment.

A pump in accordance with the present invention may be used either with bottles which are vented or bottles which are not vented. Various venting arrangements can be provided so as to relieve any vacuum which may be created within the bottle 60. Alternatively, the bottle 60 may be configured, for example, as being a bag or the like which is readily adapted for collapsing.

The pump assembly is advantageous for fluids having viscosities in excess of 1000 cP, more preferably in excess of 2000 cP, 4000 cP or 5000 cP. As used in the application, the term fluid includes flowable materials which flowable materials include but are not limited to liquids. The pump is also useful with fluids having low viscosity by which are viscoelastic.

Each of the various embodiments of the pump assemblies is adapted for dispensing flowable materials including liquids. The various embodiments have advantageous use with pastes and flowable materials with relatively high viscosity compared to water, but may be used with any liquids such as water and alcohol.

Flowable materials have different dynamic viscosity typically measured in centipoises (cP) which are temperature sensitive. Centipoise is the cgs physical unit for dynamic viscosity whereas the SI physical unit for dynamic viscosity is pascal-second (Pa). One centipoise (cP) equals one milli pascal-second (mPa). Typical viscosities for exemplary flowable materials at room temperatures in the range of 65 to 75 degrees F. are set out in the table below:

| Viscosity in cP or mPa | Flowable Material |
|---|---|
| 1 | Water |
| 103 | Peanut oil |
| 180 | Tomato juice |
| 435 | Maple Syrup |
| 1000 | Spaghetti Sauce |
| 2000 | Barbecue Sauce |
| 2250 | Chocolate Syrup |
| 5000 | Shampoo |
| 5000 | Hand Lotion |
| 5000+ | Mayonnaise |
| 10,000 | Mustard |
| 50,000 | Ketchup |
| 64,000 | Petroleum Jelly |
| 70,000 | Honey |
| 100,000 | Sour Cream |
| 250,000 | Peanut Butter |

The pumps in accordance with the preferred embodiments are preferably adapted for dispensing flowable materials having viscosities at room temperature greater than 400 cP, more preferably greater than 1000 cP, more preferably greater than 2000 cP, more preferably greater than 4000 cP and, more preferably, greater than 5000 cP. The pumps in accordance with the preferred embodiments are suitable for dispensing viscous hand creams and lotions which may have viscosities at room temperature greater than 4000 cP and, for example, in the range of 1,000 cP to 100,000 cP, more preferably 2,000 to 70,000 cP.

Although the disclosure describes and illustrates a preferred embodiment of the invention, it is to be understood that the invention is not limited to these particular embodiments. Many variations and modifications will now occur to those skilled in the art.

We claim:

1. A method of dispensing a fluid comprising:

passing fluid longitudinally outwardly through an elongate discharge passageway as a continuous fluid stream completely filling the passageway to a discharge outlet of the passageway to thereby dispense the continuous stream completely filling the passageway from the discharge outlet, and after discharge of the continuous stream completely filling the passageway from the discharge outlet, injecting into the passageway completely filled by the continuous stream an allotment of air proximate the discharge outlet of a volume sufficient to substantially sever an inner stream portion of the fluid stream inward of the injected allotment of air from an outer stream portion of the fluid stream outward of the injected allotment of air.

2. A method as claimed in claim 1 wherein after injecting the allotment of air into the passageway sufficient to substantially sever the inner stream portion from an outer stream portion, drawing the inner stream portion of the fluid stream longitudinally inwardly within the passageway.

3. A method as claimed in claim 2 wherein in the step of injecting the allotment of air into the passageway sufficient to substantially sever the inner stream portion from the outer stream portion displacing with the injected allotment of air the outer stream portion outwardly in the passageway relative the inner stream portion.

4. A method as claimed in claim 3 wherein fluid moving through the discharge passageway towards the discharge outlet moves downwardly, and wherein after injecting the allotment of air into the passageway sufficient to substantially sever the inner stream portion from an outer stream portion, drawing the inner stream portion of the fluid stream longitudinally inwardly and upwardly within the passageway to assist in severing the inner stream portion from the outer stream portion.

5. A method as claimed in claim 1 wherein fluid moving through the discharge passageway towards the discharge outlet moves downwardly, and wherein after injecting the allotment of air into the passageway sufficient to substantially sever the inner stream portion from an outer stream portion, drawing the inner stream portion of the fluid stream longitudinally inwardly and upwardly within the passageway to assist in severing the inner stream portion from the outer stream portion.

6. A method as claimed in claim 1 wherein the injection of the allotment of air into the passageway is via an air port opening selected from the group of an air port opening disposed annularly about the passageway and an air port opening which opens radially inwardly into the passageway.

7. A method as claimed in claim 6 wherein after injecting the allotment of air into the passageway to substantially sever the inner stream portion from an outer stream portion, drawing back air via the air port from the passageway.

8. A method as claimed in claim 1 wherein a pump assembly is operated to pass the fluid longitudinally outwardly through the elongate discharge passageway as the fluid stream.

9. A method as claimed in claim 1 wherein the injection of the allotment of air forms an air bubble in the passageway, which air bubble extends across a substantial portion of the cross-section of the passageway.

10. A method as claimed in claim 9 wherein the air bubble extends from within the passageway to at least partially outwardly of the discharge outlet.

11. A method as claimed in claim 10 wherein while the air bubble extends at least partially outwardly of the discharge outlet drawing the inner stream portion of the fluid stream longitudinally inwardly within the passageway to assist in breaking of the bubble.

12. A method as claimed in claim 1 wherein the fluid has a viscosity in excess of 400 centipoises.

13. A method as claimed in claim 8 wherein after injecting the allotment of air into the passageway to substantially sever the inner stream portion from the outer stream portion, operating the pump assembly to draw back the inner stream portion of the fluid stream longitudinally inwardly within the passageway.

14. A method as claimed in claim 10 wherein while the air bubble extends at least partially outwardly of the discharge outlet performing at least one procedure selected from the group of procedures of:

drawing air back from the air bubble via the passageway, and drawing the inner stream portion of the fluid stream longitudinally inwardly within the passageway to assist in breaking of the bubble.

15. A method of dispensing a fluid comprising:

operating a pump assembly to pass fluid longitudinally outwardly through an elongate discharge passageway as a fluid stream to thereby dispense the stream at a discharge outlet of the passageway, and injecting an allotment of air into the passageway proximate the discharge outlet of a volume sufficient to substantially sever an inner stream portion of the fluid stream inward of the injected allotment of air from an outer stream portion of the fluid stream outward of the injected allotment of air, and after injecting the allotment of air into the passageway to substantially sever the inner stream portion from the outer stream portion, operating the pump assembly to draw back the inner stream portion of the fluid stream longitudinally inwardly within the passageway.

16. A method as claimed in claim 15 wherein the pump assembly is a piston pump having a piston-forming element reciprocally movable relative a piston chamber-forming body of the assembly to pass fluid longitudinally through the passageway.

17. A method as claimed in claim 15 wherein the injection of the allotment of air forms an air bubble in the passageway, which air bubble extends across a substantial portion of the cross-section of the passageway.

18. A method as claimed in claim 17 wherein the air bubble extends from within the passageway to at least partially outwardly of the discharge outlet; and wherein while the air bubble extends at least partially outwardly of the discharge outlet performing at least one procedure selected from the group of procedures of:

drawing air back from the air bubble via the passageway, and drawing the inner stream portion of the fluid stream longitudinally inwardly within the passageway to assist in breaking of the bubble.

19. A method of dispensing a fluid comprising:

passing fluid longitudinally outwardly through an elongate discharge passageway as a fluid stream to thereby dispense the stream at a discharge outlet of the passageway, and injecting an allotment of air into the passageway proximate the discharge outlet of a volume sufficient to substantially sever an inner stream portion of the fluid stream inward of the injected allotment of air from an outer stream portion of the fluid stream outward of the injected allotment of air, wherein the injection of the allotment of air forms an air bubble in the passageway, the air bubble extends across a substantial portion of the cross-section of the passageway, the air bubble extends from within the passageway to at least partially outwardly of the discharge outlet, and wherein while the air bubble extends at least partially outwardly of the discharge outlet drawing air back from the air bubble via the passageway.

20. A method as claimed in claim 19 wherein prior to injecting an allotment of air into the passageway, the fluid stream is passed longitudinally outwardly through the elongate discharge passageway as a continuous fluid stream completely filling the passageway at the discharge outlet.

* * * * *